(12) United States Patent
Kim et al.

(10) Patent No.: US 11,605,997 B2
(45) Date of Patent: Mar. 14, 2023

(54) ELECTRIC MOTOR ASSEMBLY AND HAIR DRYER HAVING THE SAME

(71) Applicant: LG Electronics Inc., Seoul (KR)

(72) Inventors: Jaeho Kim, Seoul (KR); Sunghyun Kim, Seoul (KR); Kyungho Ha, Seoul (KR); Sunghoon Kwak, Seoul (KR)

(73) Assignee: LG Electronics Inc., Seoul (KR)

( * ) Notice: Subject to any disclaimer, the term of this patent is extended or adjusted under 35 U.S.C. 154(b) by 18 days.

(21) Appl. No.: 17/142,920

(22) Filed: Jan. 6, 2021

(65) Prior Publication Data

US 2021/0344250 A1 Nov. 4, 2021

(30) Foreign Application Priority Data

Apr. 29, 2020 (KR) .................. 10-2020-0052474

(51) Int. Cl.
*H02K 5/173* (2006.01)
*H02K 11/33* (2016.01)
*H02K 7/14* (2006.01)
*H02K 5/22* (2006.01)
*A45D 20/12* (2006.01)

(52) U.S. Cl.
CPC .......... *H02K 5/1732* (2013.01); *A45D 20/12* (2013.01); *H02K 5/22* (2013.01); *H02K 7/145* (2013.01); *H02K 11/33* (2016.01)

(58) Field of Classification Search
CPC ........ H02K 5/1732; H02K 11/33; H02K 5/22; H02K 7/145
USPC .................................. 310/50, 62, 63, 89, 401
See application file for complete search history.

(56) References Cited

U.S. PATENT DOCUMENTS

| 2,822,123 | A | * | 2/1958 | Cole ................. | H02K 9/24 |
| | | | | | 415/199.2 |
| 5,073,736 | A | * | 12/1991 | Gschwender ......... | H02K 11/33 |
| | | | | | 310/43 |
| 2010/0213776 | A1 | * | 8/2010 | Muller ............... | H02K 5/15 |
| | | | | | 310/83 |
| 2017/0170709 | A1 | | 6/2017 | Simeon et al. | |

(Continued)

FOREIGN PATENT DOCUMENTS

| JP | 2019024276 | | 2/2019 | | |
| JP | 2019103168 | | 6/2019 | | |
| JP | 2019103168 | A * | 6/2019 | ............ | F04D 17/00 |

(Continued)

OTHER PUBLICATIONS

Office Action in Korean Appln. No. 10-2020-0052474, dated Jul. 12, 2021, 13 pages (with English translation).

*Primary Examiner* — Jose A Gonzalez Quinones
(74) *Attorney, Agent, or Firm* — Fish & Richardson P.C.

(57) ABSTRACT

An electric motor assembly for, for example, a hair dryer, includes an impeller, an outer housing in which the impeller is accommodated, an inner housing concentrically disposed in the outer housing, a stator having one side thereof accommodated in the inner housing, a rotor provided with a rotating shaft having one end coupled to the impeller and rotatably accommodated in the stator, a first bearing disposed at one side of the rotor, a second bearing disposed at another side of the rotor, and a bracket coupled to the stator and the outer housing so as to support the second bearing. Accordingly, initial alignment of the stator and the rotor may be securely maintained.

19 Claims, 18 Drawing Sheets

(56) References Cited

U.S. PATENT DOCUMENTS

2019/0027998 A1\* 1/2019 Takaki .................... F04D 29/26
2021/0235951 A1\* 8/2021 Hwang .................... A47L 9/22

FOREIGN PATENT DOCUMENTS

| KR | 1020120085007 | | 7/2012 |
| KR | 101229109 | B1 \* | 2/2013 |
| KR | 200486315 | | 5/2018 |
| KR | 1020190127044 | | 11/2019 |

\* cited by examiner

ELECTRIC MOTOR ASSEMBLY AND HAIR DRYER HAVING THE SAME

CROSS-REFERENCE TO RELATED APPLICATION

This application claims the benefit of Korean Patent Application No. 10-2020-0052474, filed on Apr. 29, 2020, the disclosure of which is incorporated by reference herein in its entirety.

TECHNICAL FIELD

The present disclosure relates to an electric motor assembly, and a hair dryer having the same.

BACKGROUND

As is well known, an electric motor is an apparatus that converts electric energy into mechanical energy. Electric motors include a stator and a rotor rotatably disposed with respect to the stator. These electric motors are manufactured in various sizes and weights depending on the purpose of use.

Size and weight reduction may be desired in an electric motor applied to a handheld appliance or handheld device (hereinafter, "handheld device") that can be held and used in one or both hands, among others.

Some electric motors applied to handheld devices, such as a hair dryer and/or a vacuum cleaner, can include an impeller. As for electric motor assemblies used in such handheld devices, size and weight reduction can improve convenience of use. Further, high-speed operation by increasing the rotation speed of the impeller of the electric motor assembly is desired to maintain the same air volume (airflow as measures in, for example, Cubic Feet Per Minute) and/or wind pressure (wind pressure load). However, in such an electric motor assembly of these handheld devices, a stator and a rotor are relatively small in size. Therefore, there is a limitation in increasing a coupling force and also securely maintaining initial axial alignment.

In particular, typical electric motor assemblies may not be suitable for supporting a bearing that rotatably supports a rotating shaft of the rotor, thereby increasing lateral (or transverse direction) displacement of the rotating shaft. This results in abrasion or wear of the bearing, and thus reduces the lifespan of the bearing.

In addition, when the electric motor assembly is configured to have a pair of frames that accommodate a stator and a rotor therein and are coupled to each other face to face by fastening by a bolt, the size of the pair of frames is significantly increased compared to the stator size, thereby increasing the outer size excessively. As the size of the pair of frames is increased, weight is remarkably increased accordingly. On the other hand, if the size of the pair of frames is reduced, the stator and the rotor are reduced in size. This may lead to a decrease in a motor output.

In other electric motor assemblies for handheld devices, two bearings are accommodated in a housing and spaced apart from each other, and an impeller is disposed on one side of the bearing and one side of a rotor is supported on another side of the bearing. However, this design may not be suitable for reducing lateral displacement of a rotating shaft. This may also cause a limitation in increasing the maximum rpm (revolutions per minute) of the electric motor assembly.

SUMMARY

The present disclosure describes an electric motor assembly having an outer size that is not overly large compared to a size of a stator, and capable of securely maintaining an initial alignment state of the stator and a rotor. The present disclosure further describes a hair dryer having the electric motor assembly.

The present disclosure also describes an electric motor assembly capable of reducing lateral displacement of a rotor by supporting both sides of the rotor in a rotatable manner, and a hair dryer having the same.

The present disclosure also describes an electric motor assembly capable of reducing a stator and a rotor in size and enabling high-speed rotation, and a hair dryer having the same.

Particular implementations of the present disclosure provide an electric motor assembly that includes an impeller, an outer housing that receives the impeller, an inner housing that is positioned in the outer housing and positioned concentrically with the impeller, a stator that is positioned at least partially in the inner housing, a rotor that is configured to rotate relative to the stator and includes a rotating shaft coupled to the impeller, a first bearing that is disposed at a first side of the rotor and supports the rotating shaft, a second bearing that is disposed at a second side of the rotor and supports the rotating shaft, and a bracket that is disposed at the second side of the rotor and that has an inner surface coupled to the stator and an outer surface coupled to the outer housing. The second side of the rotor may be opposite to the first side of the rotor along an axial direction of the rotor. The first bearing may be positioned inside the inner housing, and the second bearing is positioned at the bracket.

Particular implementations of the present disclosure provide a hair dryer that includes a hair dryer body having an air outlet port, a handle, and an electric motor assembly. The handle has an air inlet port. The handle is connected to and in fluid communication with the hair dryer body. The electric motor assembly is disposed in the handle and includes an impeller, an outer housing that receives the impeller, an inner housing that is positioned in the outer housing and positioned concentrically with the impeller, a stator that is positioned at least partially in the inner housing, a rotor that is configured to rotate relative to the stator and includes a rotating shaft coupled to the impeller, a first bearing that is disposed at a first side of the rotor and configured to support the rotating shaft, a second bearing that is disposed at a second side of the rotor and configured to support the rotating shaft, and a bracket that is disposed at the second side of the rotor and that has an inner surface coupled to the stator and an outer surface coupled to the outer housing. The second side of the rotor may be opposite to the first side of the rotor along an axial direction of the rotor. The first bearing may be positioned inside the inner housing, and the second bearing is positioned at the bracket.

In some implementations, each of the electric motor assembly and the hair dryer can optionally include one or more of the following features. The outer housing includes an outer housing body and a plurality of legs extending from the outer housing body toward the bracket. The bracket includes a bearing accommodation portion that receives the second bearing, and a plurality of bridges that extend from the bearing accommodation portion toward the stator. The plurality of bridges of the bracket include leg contact portions that contact the plurality of legs of the outer housing, respectively. Each of the plurality of bridges of the bracket includes a stator contact portion that defines a cutout and that contacts an outer surface of the stator. Each of the plurality of bridges of the bracket includes an end contact portion that contacts an end of the stator. The stator may include a stator core defining a rotor receiving hole, and a stator coil wound around the stator core. The stator core includes a coupling protrusion. The inner housing defines a slit that receives the coupling protrusion. Each of the plurality of bridges of the bracket includes a coupling protrusion accommodating portion that receives the coupling protrusion of the stator core. The stator further comprises an insulator inserted between the stator core and the stator coil. The insulator includes an end turn insulation portion that axially protrudes from an end of the stator core and extends in a circumferential direction. The end turn insulation portion is disposed between the stator coil and the plurality of bridges of the bracket. The electric motor assembly may include a Printed Circuit Board (PCB) provided at a side of the bracket and electrically connected to the stator coil. The PCB has a plurality of connection pins protruding toward the insulator and electrically connected to the stator coil. The insulator includes a plurality of connection pin coupling portions to which the plurality of connection pins of the PCB are coupled. Each of the plurality of bridges includes: a radial section that radially protrudes from the bearing accommodation portion, and an axial section that is connected to the radial section and extends from the radial section in the axial direction. Each of the plurality of bridges defines a cavity. Each of the plurality of bridges includes a protruding end having a cross section that gradually decreases along the axial direction. Each of the plurality of legs of the outer housing has a width that gradually decreases along a longitudinal direction of each of the plurality of legs. The electric motor assembly may include a plurality of vanes positioned between the inner housing and the outer housing. Each of the plurality of vanes has a first side connected to the inner housing and a second side connected to the outer housing. Each of the plurality of vanes has a first end and a second end opposite to the first end along the axial direction. The first end is positioned farther from the impeller along the axial direction than the second end is. The first end is located ahead of the second end with respect to a rotation direction of the impeller. The outer housing includes a support ring that protrudes from an outer surface of the outer housing and extends along a circumferential direction of the outer housing. The rotor includes a permanent magnet coupled to the rotating shaft and configured to rotate with the rotating shaft.

According to one aspect of the subject matter described in this application, an electric motor assembly is configured such that both sides of a rotor are supported by bearings, respectively. Of the bearings, one bearing is accommodated in a housing and another bearing is accommodated in a bracket, and an inner surface of the bracket is coupled to a stator and an outer surface thereof is coupled to the housing.

Implementations according to this aspect may include one or more of the following features. For example, an outer housing and an inner housing may be concentrically disposed to each other. One side of the stator may be accommodated in the inner housing. A rotor may be accommodated in the stator to be rotatable with respect to a rotating shaft. A first bearing disposed at one side of the rotor may be accommodated in the inner housing and a second bearing disposed at another side of the rotor may be accommodated inside the bracket. The inner surface of the bracket may be coupled to the stator and the outer surface thereof may be coupled to the outer housing, thereby reducing an excessive increase in outer size of the outer housing compared to a size of the stator.

Also, initial alignment of the stator and the rotor may be securely maintained. In addition, an air gap between the stator and the rotor may be securely maintained. Further, even if the outer size is reduced, the size of the stator and the rotor may be properly maintained without being excessively reduced, and thereby to easily obtain a motor output.

In some implementations, the outer housing and the bracket may be adhesively coupled to each other. Accordingly, an increase in outer size may be restricted when the outer housing and the bracket are coupled to each other.

In some implementations, the outer housing and the bracket may be coupled by a fastening member. As the fastening member is directly coupled to the outer housing and the bracket, an excessive increase in outer size may be restricted.

Here, the fastening member may pass through the outer housing and the bracket to be coupled to the stator. Accordingly, the outer housing, the bracket, and the stator may be firmly coupled to each other without an excessive increase in outer size.

In some implementations, the bearing may be configured as a ball bearing. Accordingly, rotational resistance when the rotating shaft rotates may be significantly reduced.

Further, as the bearings are disposed at both sides of the rotor, lateral displacement when the rotor rotates may be remarkable reduced. This may allow the rotor to be rotated at a high speed.

In some implementations, the rotor may be configured to rotate at 110 to 150 krpm. In some implementations, the rotor may be configured to rotate at 120 to 140 krpm.

According to another aspect, an electric motor assembly includes an impeller; an outer housing in which the impeller is accommodated; an inner housing concentrically disposed on one side of the impeller in the outer housing; a stator having one side thereof accommodated in the inner housing; a rotor provided with a rotating shaft having one end coupled to the impeller, and rotatably accommodated in the stator; a first bearing disposed at one side of the rotor along an axial direction and supporting the rotating shaft; a second bearing disposed at another side of the rotor along the axial direction and supporting the rotating shaft; and a bracket disposed at the another side of the rotor along the axial direction and having an inner surface thereof coupled to the stator and an outer surface thereof coupled to the outer housing. The first bearing is provided inside the inner housing, and the second bearing is provided at the bracket.

Implementations according to this aspect may include one or more of the following features. For example, the outer housing may be provided with an outer housing body having a cylindrical shape and a plurality of legs that extends from the outer housing body toward the bracket.

In some implementations, the outer housing and the inner housing may be made of a metal member.

In some implementations, the outer housing and the inner housing may be formed by die casting a metal member.

In some implementations, the outer housing and the inner housing may be made of aluminum, copper, brass or zinc, or an alloy including at least one of the aluminum, copper, brass, or zinc, for example.

In some implementations, the bracket may include a bearing accommodation portion in which the second bearing is accommodated and a plurality of bridges that extends from the bearing accommodation portion toward the stator.

In some implementations, the plurality of bridges may be provided with leg contact portions formed in a cutout manner to be brought into contact with the plurality of legs, respectively.

In some implementations, the plurality of legs and the leg contact portions are configured to be in surface contact with each other, respectively. Accordingly, a contact area between each leg and each leg contact portion may be increased. As a result, a coupling force between the plurality of legs and the leg contact portions may be increased, respectively.

In some implementations, the plurality of legs may be coupled to an outside of the plurality of bridges, respectively.

In some implementations, the leg contact portions may be provided on outer surfaces of the plurality of bridges, respectively.

In some implementations, the leg contact portions may have cross-sectional shapes that correspond to cross-sectional shapes of the plurality of legs, respectively.

In some implementations, the plurality of legs may each have an arcuate cross section.

In some implementations, the plurality of legs may each have a cross section with a center thereof convex outward.

In some implementations, the leg contact portions may each have a cross section with a center thereof convex outward.

In some implementations, each of the plurality of bridges may be provided with a stator contact portion formed in a cutout manner so as to be in contact with an outer surface of the stator.

In some implementations, the stator contact portions may be formed on inner surfaces of the plurality of bridges, respectively.

In some implementations, the stator contact portions may be configured to be in surface contact with the outer surface of the stator.

In some implementations, the stator contact portions may each have a cross section that corresponds to a cross-sectional shape of the outer surface of the stator.

In some implementations, the stator contact portions may each have a cross-sectional shape with a center thereof convex outward.

In some implementations, the stator contact portions may each have an arcuate cross section with a center thereof convex outward.

In some implementations, each of the plurality of bridges may be provided with an end contact portion that is brought into contact with an end of the stator.

Accordingly, the stator and the bracket may be constrained to each other in the axial direction. Thus, relative movement between the stator and the bracket along the axial direction may be suppressed.

In some implementations, the end contact portions may be respectively formed inside the stator contact portions along a radial direction of the stator.

In some implementations, the stator may include a stator core provided therein with a rotor receiving hole and a stator coil wound on the stator core.

In some implementations, the stator core may be provided with a coupling protrusion that protrudes in a radial direction and extends in the axial direction.

In some implementations, the inner housing may be provided with a slit in which the coupling protrusion is accommodated.

In some implementations, the slit may extend along the axial direction from an opening of the inner housing.

Accordingly, when the inner housing and the stator are coupled to each other, the inner housing and the stator may move relative to each other along the axial direction and may be constrained to each other with respect to a rotation direction. Thus, the stator may be assembled in a correct position with respect to the inner housing. In addition, when the rotor is rotated, relative rotation of the stator may be restricted.

In some implementations, each of the plurality of bridges may be provided with a coupling protrusion accommodating portion in which the coupling protrusion is accommodated. Accordingly, a coupling force between the plurality of bridges and the stator may be increased. Further, rotational displacement of the bracket along a circumferential direction of the stator may be restricted during operation.

In some implementations, the stator may further include an insulator made of an insulating member and inserted between the stator core and the stator coil. Accordingly, a short circuit between the stator core and the stator coil may be prevented.

In some implementations, the insulator may be provided with an end turn insulation portion that axially protrudes from an end of the stator core and extends in a circumferential direction so as to be disposed between the stator coil and the plurality of bridges. In some implementations, the end turn insulation portion may be disposed inside the plurality of bridges.

The bracket may be formed of a metal member. The bracket may be made of aluminum, copper, brass or zinc, or an alloy including at least one of the aluminum, copper, brass, or zinc. Accordingly, a short circuit between the stator coil and the bracket may be prevented.

In some implementations, the bracket may be made of a synthetic resin member.

Accordingly, weight of the bracket may be reduced.

In some implementations, the bracket may be provided therein with a metal member and covered with a synthetic resin member outside. Accordingly, strength (rigidity) of the bracket may be increased while reducing weight of the bracket.

A Printed Circuit Board (PCB) electrically connected to the stator coil may be further provided. Accordingly, power may be supplied to the stator coil through the PCB.

In addition, the stator coil may be controlled by the PCB. In some implementations, the PCB may include a plurality of connection pins protruding toward the insulator and connected to the stator coil.

In some implementations, the insulator may be provided with a plurality of connection pin coupling portions to which the connection pins are coupled.

In some implementations, the stator coil may be connected to the plurality of connection pins through the connection pin coupling portions. This may allow the stator coil and the PCB to be electrically connected to each other.

In some implementations, the PCB may include a power supply circuit for supplying power to the stator coil.

In some implementations, the bearing accommodation portion of the bracket may be formed in a cylindrical shape.

In some implementations, the plurality of bridges may radially protrude from an outer circumferential surface of the bearing accommodation portion of the bracket to be bent and extend along the axial direction.

In some implementations, each of the plurality of bridges may include a radial section that radially protrudes from the bearing accommodation portion and an axial section that is bent from the radial section and extends in the axial direction.

Here, each of the plurality of bridges may be provided with a cavity recessed in a thickness direction thereof. Accordingly, weight of the bracket may be reduced.

In some implementations, each of the plurality of bridges may include a protruding end having a cross section that gradually decreases along the axial direction. Thus, flow resistance of air moved by the impeller may be reduced. Further, generation of noise due to a flow of the air may be suppressed.

In some implementations, the plurality of legs may each have a width that gradually decreases along a protruding direction thereof. Accordingly, deformation of the plurality of legs may be suppressed.

In some implementations, a plurality of vanes each having one side connected to the inner housing and another side connected to the outer housing may be provide between the inner housing and the outer housing. Accordingly, the inner housing and the outer housing may be securely disposed concentrically with each other.

In some implementations, each of the plurality of vanes may be formed such that one end far from the impeller is located forward than another end close to the impeller with respect to a rotation direction of the impeller. Thus, air moved by the impeller may be properly distributed along an air flow path between the inner housing and the outer housing, allowing the air to flow in a stable manner.

In some implementations, the outer housing may be provided with a support ring that protrudes from an outer surface thereof and extends along a circumferential direction.

In some implementations, the support ring may be provided at an outlet end of the outer housing along a flow direction of air moved by the impeller. Accordingly, rigidity of the outlet end of the outer housing may be increased. As a result, generation of vibration at the outlet end of the outer housing may be reduced. Also, deformation of the plurality of legs at the outlet end of the outer housing may be further reduced. Thus, a coupling force between the plurality of legs and the bracket may be increased.

In some implementations, the rotor may be provided with a permanent magnet coupled to the rotating shaft so as to be integrally rotatable with the rotating shaft. Accordingly, a size of an outer diameter of the rotor may be significantly reduced. Thus, a radial size of the outer housing, the inner housing, the stator, and the rotor may be reduced.

In some implementations, the outer housing may have an outer diameter of 20 mm or less.

According to another aspect, a dryer includes a dryer body having an air outlet port, a handle having an air intake port and connected to communicate with the dryer body, and the electric motor assembly provided inside the handle.

Implementations according to this aspect may include one or more of the following features. For example, the handle or the dryer body may be provided with an electric heater for heating air.

As described above, according to the implementations of the present disclosure, a first bearing and a second bearing may be provided at both sides of a rotor, respectively. The first bearing may be accommodated in an inner housing and the second bearing may be accommodated in a bracket, and an inner surface of the bracket may be coupled to a stator and an outer surface thereof may be coupled to an outer housing. This may result in preventing an excessive increase in outer size of the outer housing compared to a size of the stator. Also, initial alignment of the stator and the rotor may be securely maintained. In addition, an air gap between the stator and the rotor may be securely maintained.

As the outer housing is provided with a plurality of legs, the bracket is provided with a plurality of bridges, and each of the plurality of bridges is provided with a leg contact portion formed in a cutout manner to be in contract with the leg, a coupling force between the outer housing and the bracket may be increased.

As each of the plurality of bridges of the bracket is provided with an end contact portion in contact with an end surface of the stator, an axial clearance between the stator and the bracket may be effectively reduced.

As the stator is provided with a coupling protrusion that protrudes in a radial direction, and the inner housing is provided with a slit in which the coupling protrusion is accommodated, a circumferential clearance between the stator and the inner housing may be reduced.

As each of the plurality of bridges of the bracket is provided with a coupling protrusion accommodating portion in which the coupling protrusion is accommodated, a rotational clearance between the stator and the bracket may be effectively reduced.

As the stator is provided with an insulator, and the insulator is provided with an end turn insulation portion provided between a stator coil and the plurality of bridges, a short circuit between the stator coil and the bracket may be prevented.

As each of the plurality of bridges of the bracket is provided with a cavity recessed in a thickness direction, weight of the bracket may be reduced.

As each of the plurality of bridges of the bracket is provided with a protruding end having a cross section that gradually decreases along an axial direction, flow resistance when air is moved by the impeller, due to the plurality of bridges, may be reduced.

DETAILED DESCRIPTION

Figure 1:
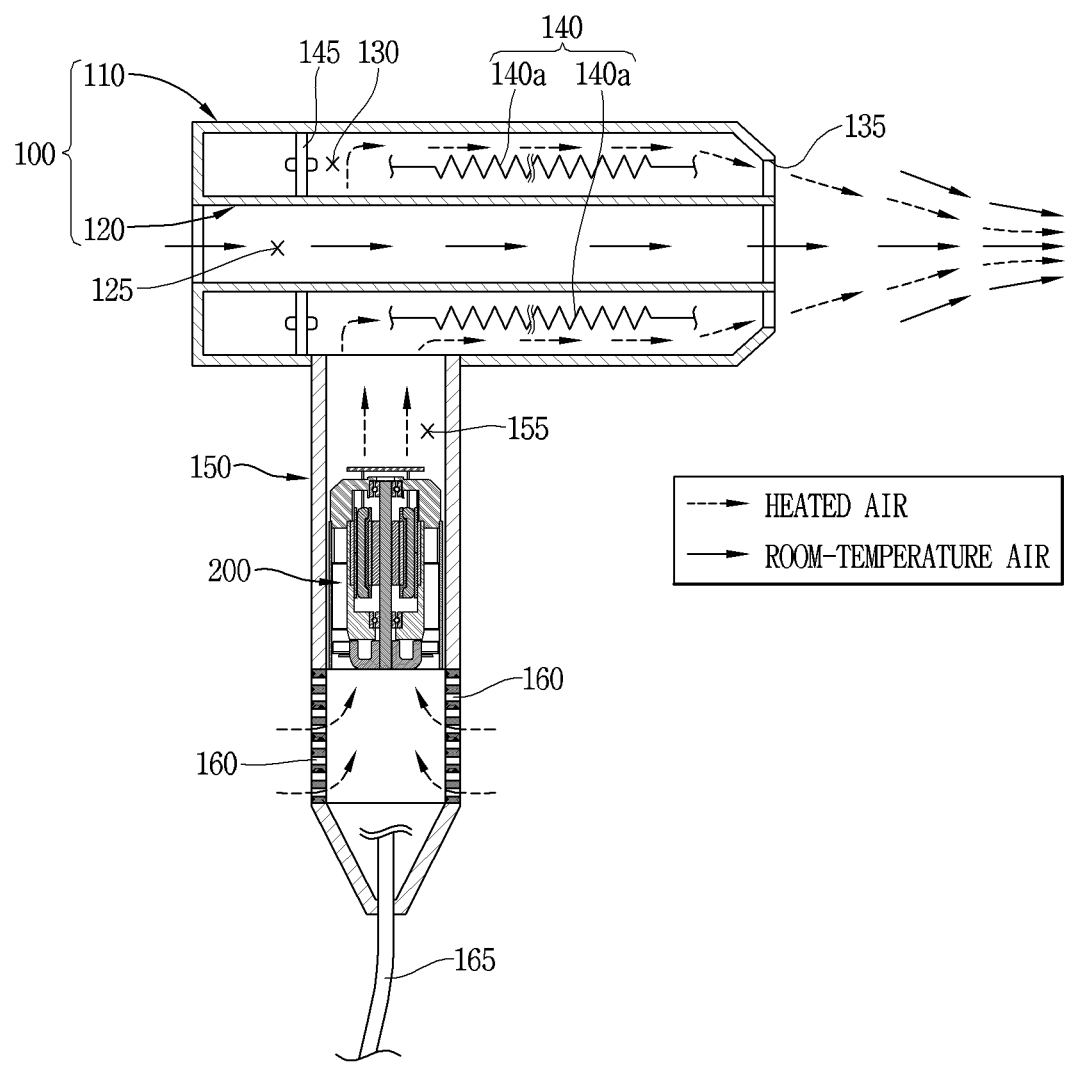
FIG. 1 is a cross-sectional view of a hair dryer having an electric motor assembly according to one implementation of the present disclosure.

Hereinafter, implementations of the present disclosure will be described in detail with reference to the accompanying drawings. Herein, the same or like reference numerals denote the same or like elements even in different implementations, and a description for the same or like element may be omitted for brevity. As used herein, the singular forms "a," "an," and "the" are intended to include the plural forms as well unless the context clearly indicates otherwise. In describing implementations disclosed in the specification, moreover, detailed description for publicly known technologies will be omitted. Also, it should be noted that the accompanying drawings are merely for illustrative purposes, and therefore, they should not be construed to limit the technical spirit disclosed in the specification.

FIG. 1 is a cross-sectional view of a hair dryer having an electric motor assembly according to one implementation of the present disclosure. As illustrated in FIG. 1, a hair dryer equipped with an electric motor assembly of this implementation includes a hair dryer body 100, a handle 150, and an electric motor assembly 200.

The hair dryer body 100 is provided therein with an air flow path (or passage) 130. An air outlet port 135 through which air is discharged is provided at one side (e.g., right end in FIG. 1) of the hair dryer body 100. The hair dryer body 100 is provided at its center with a penetrating portion (e.g., a through-hole) 125, for example. When air is discharged through the air outlet port 135, air discharged from an inside of the penetrating portion 125 and the air discharged from the air outlet port 135 come or join together.

The hair dryer body 100 includes an outer case 110 and an inner case 120 provided inside the outer case 110. The air flow path 130 may be provided between the inner case 120 and the outer case 110, for example. In some implementations, the air outlet port 135 is formed between the outer case 110 and the inner case 120. The air flow path 130 may be configured to have, for example, a tube-shaped cross section.

The air flow path 130 may be provided with an electric heater 140 so as to allow air to be heated, for example. The electric heater 140 includes a heating member 140a configured to be heated by electrical resistance heat when power is applied. The heating member 140a may be implemented as a nichrome wire, for example. The heating member 140a has, for example, a coil shape.

In this implementation, the hair dryer body 100 includes the outer case 110 and the inner case 120. However, this is just an example among many others. For example, the hair dryer body 100 as a whole may define the air flow path 130 therein.

A Printed Circuit Board (PCB) 145 may be provided in one side (e.g., left side in FIG. 1) of the hair dryer body 100. The PCB 145 may be electrically connected to the electric heater 140, for example. The PCB 145 may be configured to control the electric heater 140, for example. The PCB 145 may include, for example, a control circuit that controls the electric heater 140. The PCB 145 may include, for example, a control circuit that controls the electric motor assembly 200.

In some implementations, a signal input portion (e.g., a button) to which a signal for adjusting a temperature of the electric heater 140 is input may be provided on the hair dryer body 100, or the handle 150. In some implementations, a signal input portion (e.g., a button) to which a signal for controlling operation of the electric motor assembly 200 is input may be provided on the hair dryer body 100, or the handle 150.

The handle 150 may be provided at one side (e.g., lower side in FIG. 1) of the hair dryer body 100. An accommodation space 155 is formed inside the handle 150. An air inlet port 160 is provided at one region (e.g., lower region in FIG. 1) of the handle 150 so as to allow air to be sucked into the handle 150. An upper end of the handle 150 is connected to communicate with the hair dryer body 100. Accordingly, air that has passed through an inside of the handle 150 may be introduced into the hair dryer body 100.

The electric motor assembly 200 is accommodated in the handle 150. The electric motor assembly 200 is provided with an impeller 210 to facilitate a flow of air during operation or use. The air inlet port 160 is formed at one side (e.g., lower side in FIG. 1) of the electric motor assembly 200.

A power supply cable 165 connected to an external power source is provided at a lower end of the handle 150. This may allow electric power to be supplied to electrical components inside the handle 150 and the hair dryer body 100. In some implementations, the cable 165 is connected to the electric motor assembly 200, the PCB 145, and the electric heater 140.

Figure 2:
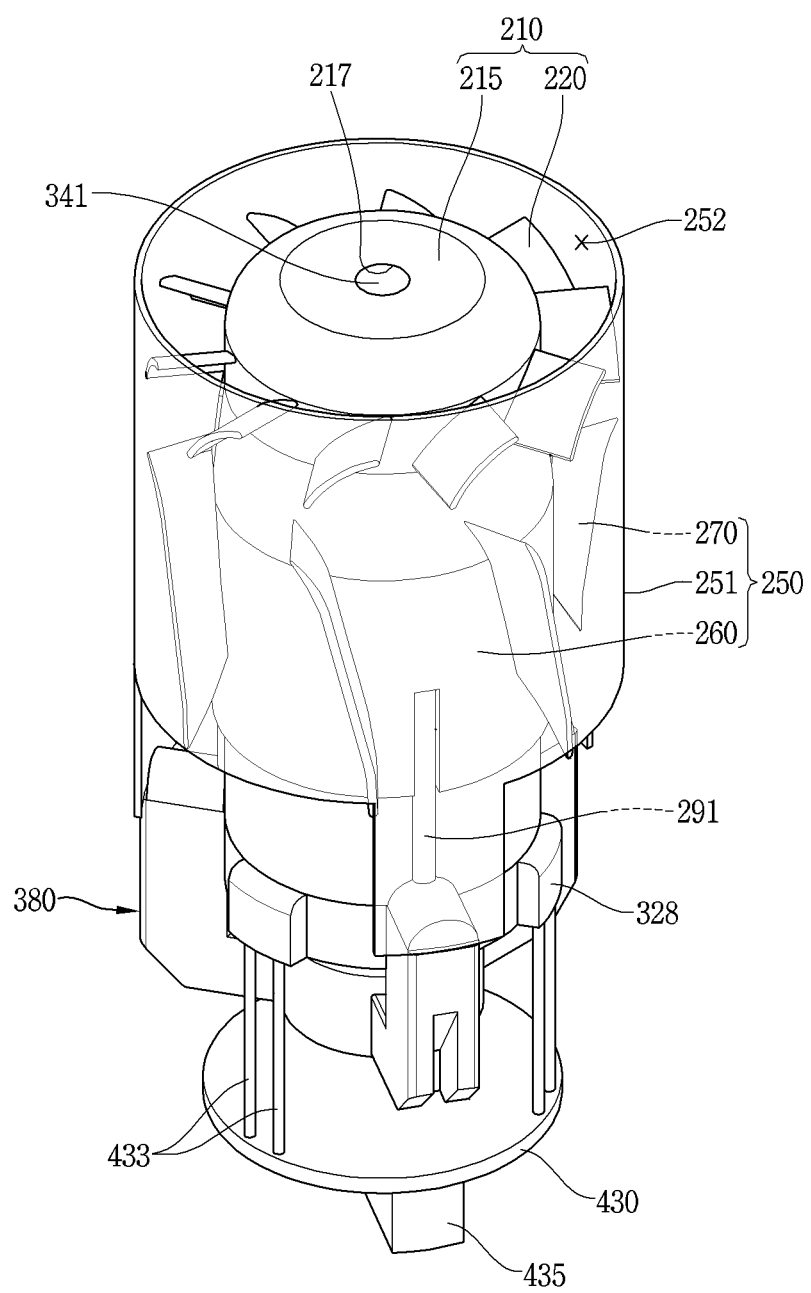
FIG. 2 is a perspective view of the electric motor assembly of FIG. 1.
Figure 3:
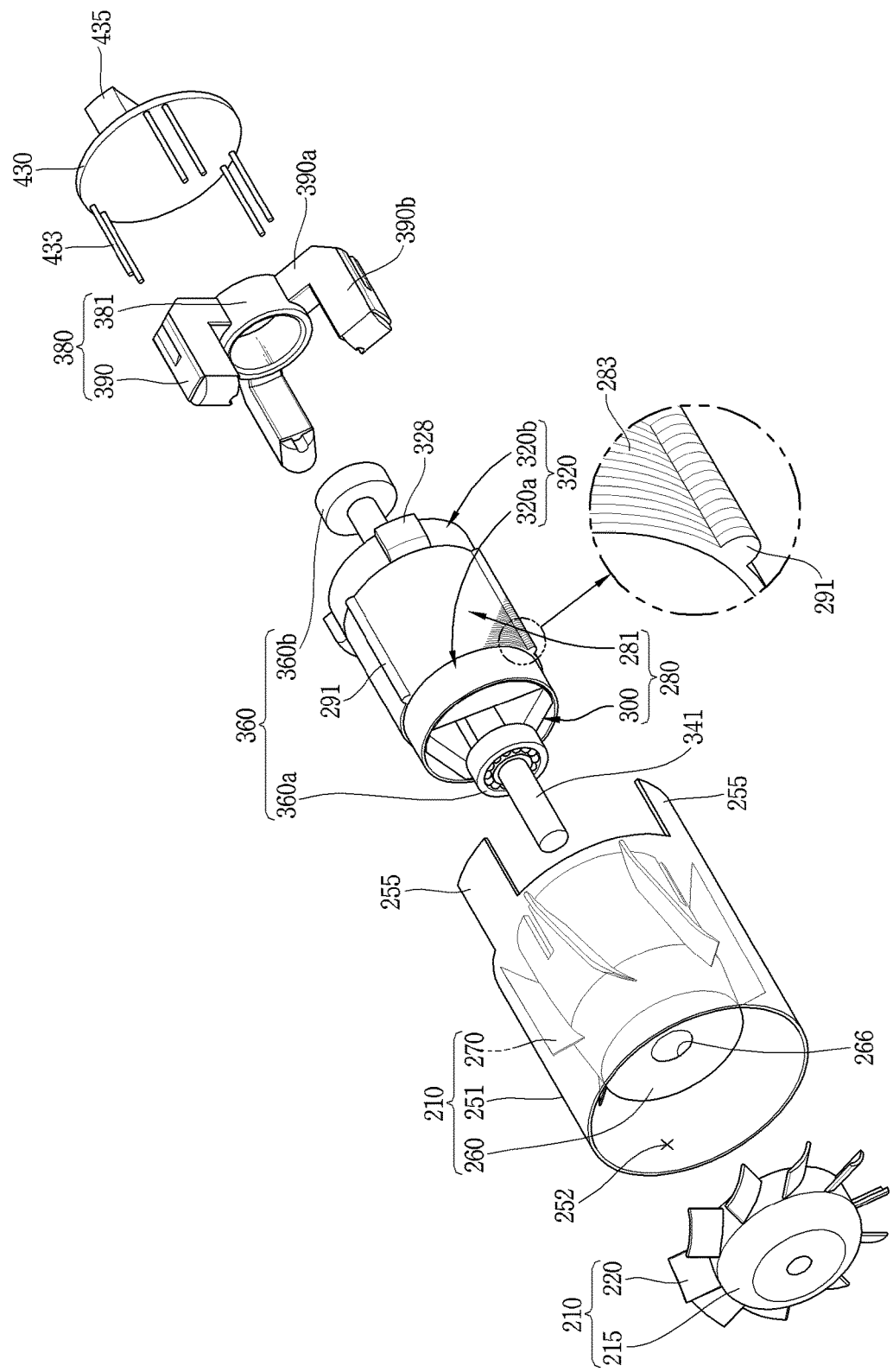
FIG. 3 is an exploded perspective view of the electric motor assembly of FIG. 2.

FIG. 2 is a perspective view of the electric motor assembly of FIG. 1, and FIG. 3 is an exploded perspective view of the electric motor assembly of FIG. 2. As illustrated in FIGS. 2 and 3, the electric motor assembly 200 of this implementation includes the impeller 210, a housing 250, a stator 280, a rotor 340, a first bearing 360a, a second bearing 360b, and a bracket 380.

The impeller 210 includes a hub 215 and a plurality of blades 220 disposed in a circumference of the hub 215. A rotating (or rotational) shaft 341 of the rotor 340 is coupled to the hub 215.

The hub 215 may be provided at its center with a rotating shaft coupling portion 217 to which the rotating shaft 341 is coupled. The rotating shaft coupling portion 217 may be axially formed through the hub 215, for example.

The rotating shaft coupling portion 217 may be configured to have a gap with the rotating shaft 341. This may allow air from an outside of the inner housing 260 to be introduced therein.

The plurality of blades 220 is spaced apart from one another along a circumferential direction of the hub 215 and inclined with respect to an axial direction.

The impeller 210 is configured to rotate counterclockwise in the drawing. When the impeller 210 rotates, air is suctioned from a tip end (e.g., upper side in FIG. 2) of the impeller 210 along the axial direction and flows in a direction away from the impeller 210 (e.g., downward direction in FIG. 2). That is, in FIG. 2, the upper side is an upstream side and the lower side is a downstream side based on a flow direction (moving direction) of air moved by the impeller 210.

The impeller 210 is made of, for example, a metal member. The impeller 210 is made of, for example, an aluminum (Al) member. Accordingly, deformation of the impeller 210 when rotating at a high speed may be prevented or reduced.

The housing 250 includes an outer housing 251 and an inner housing 260 that are disposed concentrically with respect to each other. The impeller 210 is accommodated in the outer housing 251. In this implementation, the impeller 210 is accommodated in an upper end of the outer housing 251.

When the impeller 210 rotates, air is introduced from the upper end of the outer housing 251, and air is discharged to the outside from a lower end of the outer housing 251.

Based on an air flow direction when the impeller 210 rotates, the upper end of the outer housing 251 may be referred to as an "upstream end" (or "inflow end)", and the lower end may be referred to as a "downstream end" (or "outflow end)".

The inner housing 260 is disposed inside the outer housing 251. The impeller 210 is accommodated in one side of the outer housing 251, and the inner housing 260 is disposed at one side of the impeller 210 in the outer housing 251.

A plurality of vanes 270 may be provided between the outer housing 251 and the inner housing 260. Each of the plurality of vanes 270 protrudes from an outer surface of the inner housing 260 along a radial direction and extends in the axial direction. The plurality of vanes 270 is spaced apart from one another at a predetermined distance along a circumferential direction of the inner housing 260.

Each of the plurality of vanes 270 has an end located close to the impeller 210 (upstream end, inflow end) and an end located away from the impeller 210 (downstream end, outflow end). The end adjacent to the impeller 210 is located rearward of (e.g., behind) the end being distant from the impeller 210 with respect to a rotation direction of the impeller 210. Accordingly, air moved into the outer housing 251 by the impeller 210 is properly distributed, allowing the air to flow along the axial direction in a stable manner.

The housing 250 may be formed of a metal member. The housing 250 may be formed by die casting. The housing 250 may be made of, for example, aluminum, copper, brass, or zinc. The housing 250 may be made of an alloy including at least one of the aluminum, copper, brass, and zinc, for example.

An outer diameter of the outer housing 251 may be, for example, less than or equal to 20.0 mm. With this configuration, an excessive increase in an outer diameter of the handle 150 may be suppressed. This may allow the handle 150 to be easily held or grasped. Also, this may enable more convenient use of the hair dryer. Further, an external size and weight of the electric motor assembly 200 may be reduced, thereby ensuring convenient use of the hair dryer.

Meanwhile, the stator 280 may include, for example, a stator core 281 and a stator coil 300 wound on the stator core 281. The stator coil 300 may be configured to be driven by, for example, a three-phase AC power source.

The stator core 281 may include, for example, a rotor receiving hole 285 in which the rotor 340 is rotatably accommodated. The stator core 281 may be provided with a plurality of slots 287 and a plurality of teeth 289 alternatively disposed along a circumference of the rotor receiving hole 285 (see FIG. 8).

The stator core 281 may be formed by stacking in an insulating manner a plurality of electrical steel plates 283 each having the rotor receiving hole 285, the plurality of slots 287, and the teeth 289, for example.

The plurality of teeth 289 may be, for example, three in number. The plurality of slots 287 may be, for example, three in number.

A coupling protrusion 291 that protrudes in the radial direction and extends in the axial direction is provided at an outer surface of the stator core 281. In some implementations, a plurality of coupling protrusions 291 are provided at the outer surface of the stator core 281 to be spaced apart from each another along a circumferential direction.

The stator coil 300 may be configured as concentrated winding, for example. The stator coil 300 includes, for example, a plurality of coil portions 300a intensively wound around the teeth 289, respectively. The plurality of coil portions 300a may be respectively connected to each phase (U phase, V phase, W phase) of a three-phase AC power supply, for example.

The stator coil 300 is provided with an end turn 305 that protrudes to both sides of the stator core 281. Each of the plurality of coil portions 300a is provided with the end turn 305. The rotor 340 may include, for example, the rotating shaft 341 and a permanent magnet 345 that rotates with respect to the rotating shaft 341.

The rotor 340 may be configured such that an outer diameter of the permanent magnet 345 is less than or equal to 6 mm, for example. Accordingly, weight of the rotor 340 may be significantly reduced.

The rotating shaft 341 is configured to protrude to both sides (left and right sides in the drawing) of the rotor 340. The rotating shaft 341 may have an outer diameter of 3 mm or less, for example.

The stator 280 and the rotor 340 may be configured to rotate at 110 to 150 krpm, for example. The stator 280 and the rotor 340 may be, preferably, configured to rotate at 120 to 140 krpm, for example.

The stator 280 includes an insulator 320 for insulating the stator core 281 and the stator coil 300. The insulator 320 is made of an insulation member. The insulator 320 is coupled to both sides of the stator core 281 along the axial direction.

The insulator 320 may include, for example, a slot insulation portion 322 disposed between the stator coil 300 and the slot 287, and a tooth insulation portion 324 disposed between the stator coil 300 and the tooth 289.

The insulator 320 includes, for example, an end turn insulation portion 326 disposed at a periphery of the end turn 305 of the stator coil 300. The end turn insulation portion 326 is formed in a cylindrical shape.

Bearings 360 that support the rotating shaft 341 are provided at both sides of the rotor 340. The bearings 360 include, for example, the first bearing 360a provided at one side of the rotor 340 (e.g., left side in FIG. 3) and the second bearing 360b provided at another side of the rotor 340 (e.g., right side in FIG. 3).

The bearings 360 is configured as a ball bearing, for example. Accordingly, rotational resistance when the rotating shaft 341 rotates may be significantly reduced.

In addition, as the first bearing 360a and the second bearing 360b are provided at both sides of the rotor 340, respectively, lateral displacement of the rotor 340 and/or vibration when the rotor 340 rotates may be significantly reduced. Thus, an air gap G between the stator 280 and the rotor 340 may be uniformly maintained. This configuration allows the rotor 340 to be rotated at a high speed, and vibration and noise to be significantly reduced when the rotor 340 rotates at the high speed.

Meanwhile, the bracket 380 that supports one of the bearings 360 (e.g., the second bearing 360b) is provided at another side of the rotor 340 (e.g., right side in FIG. 3).

The bracket 380 is provided with a bearing accommodation portion 381 in which the bearing 360 (e.g., the second bearing 360b) is accommodated and a plurality of bridges 390 axially extending from the bearing accommodation portion 381.

The bracket 380 may be formed of, for example, a metal member. The bracket 380 may be formed by, for example, a die casting. The bracket 380 may be made of, for example, aluminum, copper, brass, or zinc. The bracket 380 may be made of an alloy including at least one of the aluminum, copper, brass, and zinc, for example.

The plurality of bridges 390 may be, for example, three in number. The plurality of bridges 390 may be spaced apart from one another along a circumference direction of the bearing accommodation portion 381 by a predetermined distance.

A printed circuit board (PCB) 430 that is electrically connected to the stator coil 300 is provided at one side of the bracket 380 (e.g., right side of FIG. 3). The PCB 430 is formed in a disk shape, for example. In this implementation, the PCB 430 has a disk shape. However, this is just an example, and other various shapes such as a triangular shape and a "Y" shape may also be available.

The PCB 430 includes a plurality of connection pins 433 connected to the stator coil 300. The plurality of connection pins 433 may be, for example, six in number. The plurality of connection pins 433 is connected to the insulator 320. In some implementations, three of the plurality of connection pins 433 are respectively connected to one end of the three-phase (U-phase, V-phase, W-phase) coil portion 300a of the stator coil 300 so as to supply power. The remaining three of the connection pins 433 serve as a neutral wire connecting (wiring) another ends of the three-phase (U-phase, V-phase, W-phase) coil portion 300a of the stator coil 300 into one.

A connector 435 to which the cable 165 that is connected to an external power source (commercial power source) is connected is provided at one side of the PCB 430.

Figure 4:
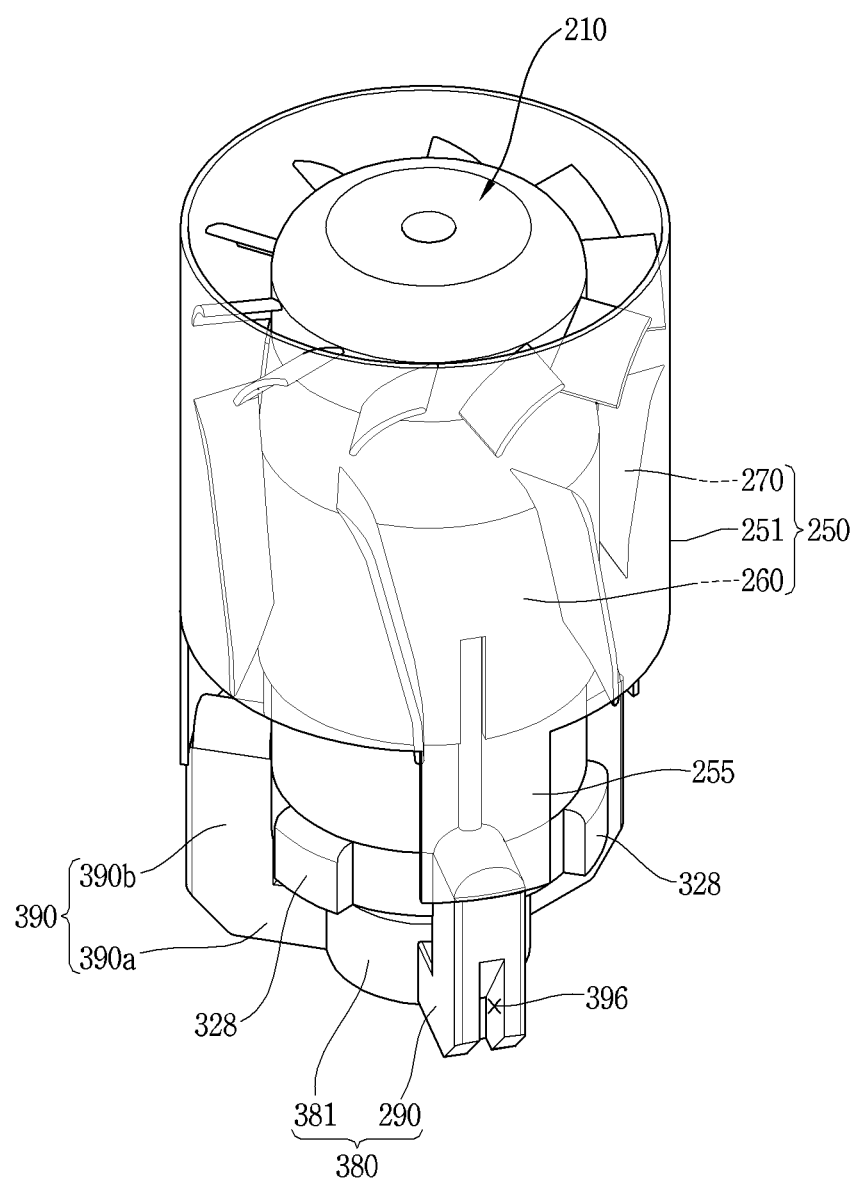
FIG. 4 is a perspective view illustrating an assembled state of the electric motor assembly excluding a PCB in FIG. 3.
Figure 5:
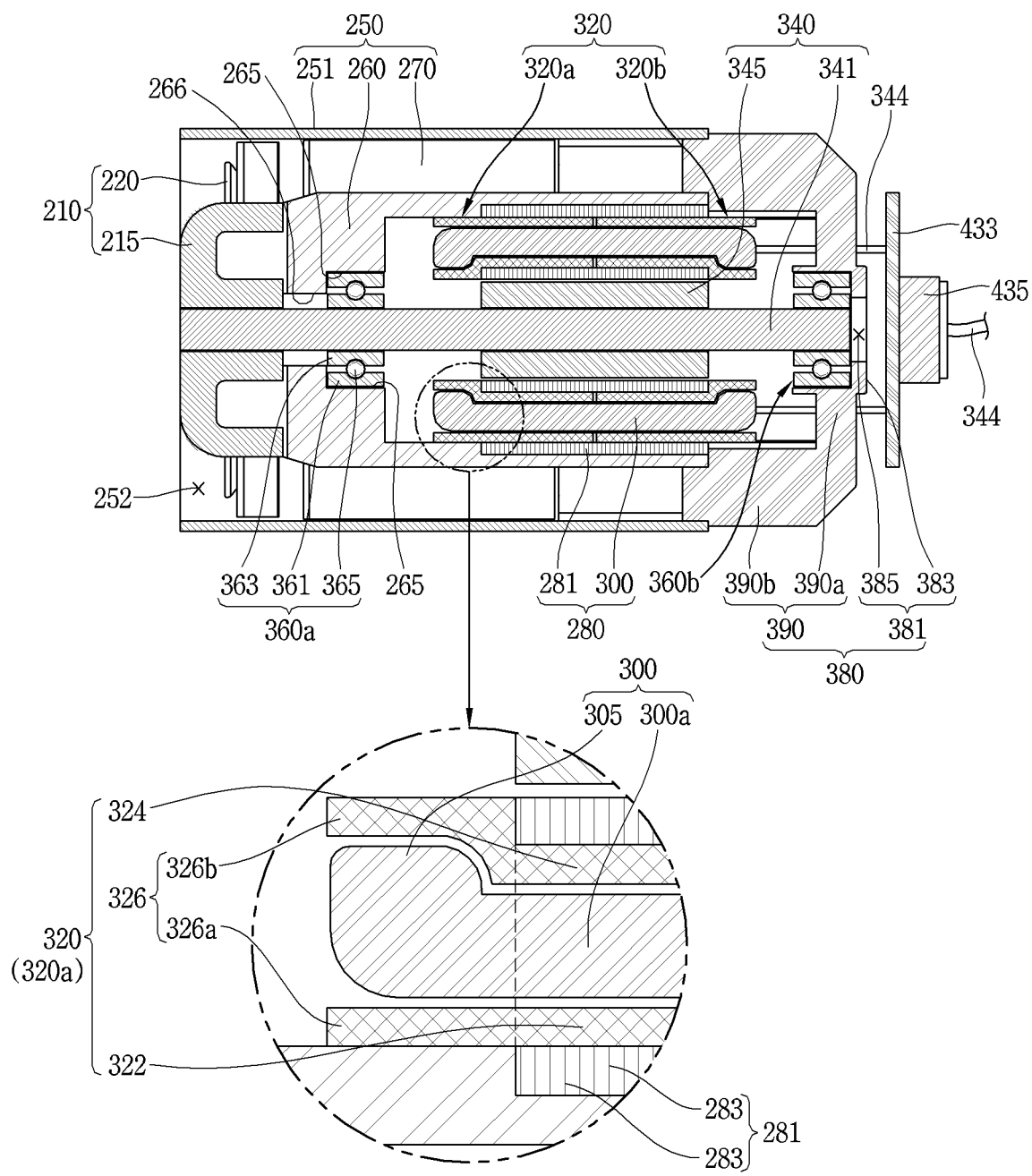
FIG. 5 is a cross-sectional view of FIG. 2.

FIG. 4 is a perspective view illustrating an assembled state of the electric motor assembly excluding the PCB of FIG. 3, and FIG. 5 is a cross-sectional view of FIG. 2. As illustrated in FIGS. 4 and 5, a bearing accommodation portion 265 in which the first bearing 360a is accommodated is provided in one side (left side in the drawing) of the inner housing 260.

A rotating shaft hole 266 is formed through a central part of the bearing accommodation portion 265 of the inner housing 260 so as to allow the rotating shaft 341 to pass therethrough.

The first bearing 360a includes an outer ring 361, an inner ring 363 concentrically disposed with the outer ring 361, and a plurality of balls 365 disposed between the outer ring 361 and the inner ring 363.

One side (e.g., left end in FIG. 5) of the stator 280 is accommodatingly coupled to an inside of the inner housing 260. The stator 280 includes the stator core 281, the stator coil 300 wound around the stator core 281, and the insulator 320 provided between the stator core 281 and the stator coil 300.

The insulator 320 includes a first insulator 320a and a second insulator 320b that are insertedly coupled to both sides of the stator core 281, respectively, along the axial direction. The first insulator 320a may be inserted from one end (e.g., left side in FIG. 5) of the stator core 281 along the axial direction, for example. The second insulator 320b may be inserted from another end (e.g., right side in FIG. 5) of the stator core 281 along the axial direction, for example. An end of the first insulator 320a and an end of the second insulator 320b are in face contact with each other inside the stator core 281.

Each of the first insulator 320a and the second insulator 320b includes the slot insulation portion 322 disposed inside the slot 287, the tooth insulation portion 324 surrounding the tooth 289, and the end turn insulation portion 326 for insulating the end turn 305 of the stator coil 300. More specifically, the slot insulation portion 322 is disposed between the stator coil 300 and an inner wall surface of the slot 287. The tooth insulation portion 324 is disposed between the stator coil 300 and the tooth 289.

Each of the end turn insulation portions 326 includes an inner insulation portion 326b disposed at an inside of the end turn 305 and an outer insulation portion 326a disposed at an outside of the end turn 305. The outer insulation portion 326a and the inner insulation portion 326b axially protrude from an end of the stator core 281 and extend along the circumferential direction, respectively. The outer insulation portion 326a and the inner insulation portion 326b may be respectively formed in a circular ring shape, for example.

The bracket 380 is provided at another side of the rotor 340. The bracket 380 is provided with the bearing accommodation portion 381 in which the second bearing 360b is accommodated.

The second bearing 360b is also provided with an outer ring 361, an inner ring 363 disposed concentrically with the outer ring 361, and a plurality of balls 365 provided between the outer ring 361 and the inner ring 363.

Figure 6:
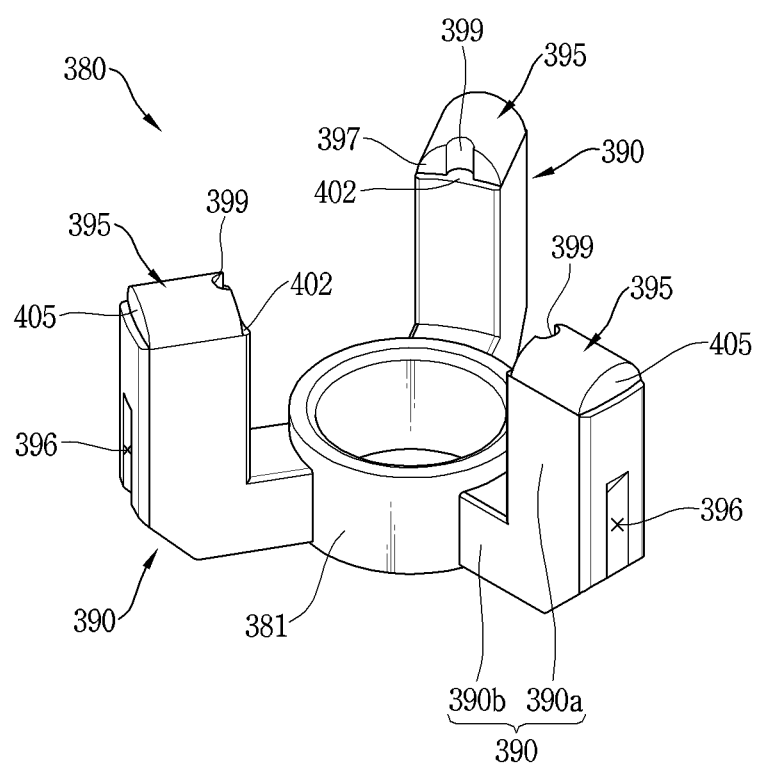
FIG. 6 is a perspective view of a bracket of FIG. 3.

FIG. 6 is a perspective view of the bracket of FIG. 3. As illustrated in FIG. 6, the bracket 380 is provided with the bearing accommodation portion 381 in which the bearing 360 (e.g., the second bearing 360b) is accommodated and the plurality of bridges 390 that axially extends from the bearing accommodation portion 381.

The bearing accommodation portion 381 of the bracket 380 is formed in a cylindrical shape. The bearing accommodation portion 381 of the bracket 380 has a size that corresponds to a size of the bearing 360 (e.g., the second bearing 360b) so as to allow the bearing 360 (e.g., the second bearing 360b) to be accommodated therein.

A stopper 383 (FIG. 5) that limits a coupling depth of the bearing 360 is provided at one side of the bearing accommodation portion 381 of the bracket 380, as illustrated in FIG. 5. The stopper 383 of the bracket 380 is configured to be in contact with one side (e.g., right end in FIG. 5) of the second bearing 360b. The stopper 383 of the bracket 380 may be formed in a circular ring shape.

The bracket 380 is provided at its center with a through-hole 385 to communicate with the outside. Accordingly, heat dissipation of the bearing 360 (e.g., the second bearing 360b) inside the bracket 380 may be facilitated.

Each of the plurality of bridges 390 is provided with, for example, a radial section 390b that radially protrudes from the bearing accommodation portion 381 and an axial section 390a that is bent from the radial section 390b to extend in the axial direction.

Each of the plurality of bridges 390 is provided with a cavity 396 recessed in its thickness direction. This may result in reducing weight of the bracket 380. The cavity 396 may be open to an outside of the bridge 390. The cavity 396 may be provided on both the radial section 390a and the axial section 390b, for example.

Inner surfaces of the axial sections 390a of the plurality of bridges 390 may be respectively configured to be disposed on a circumference that is smaller than an outer diameter of the stator core 281.

Each of the plurality of bridges 390 is provided with a protruding end 395 having a cross section that gradually decreases along the axial direction. The protruding ends 395 may each have an arcuate cross section, for example.

Each of the protruding ends 395 may have a cross section that gradually decreases toward the impeller 210, for example. Each of the protruding ends 395 may have an arcuate cross section that protrudes toward the impeller 210, for example. This may allow flow resistance of air moved by the impeller 210 to be reduced. Accordingly, air noise generated by the bracket 380 when the impeller 210 rotates may be suppressed.

A stator contact portion 397 that is brought into contact with an outer surface of the stator 280 (e.g., the stator core 281) is provided at an inner surface of each of the plurality of bridges 390 (e.g., the protruding end 395) of the bracket 380.

The stator contact portion 397 of the bracket 380 may be formed as a curved surface that corresponds to a curvature of the outer surface of the stator core 281. The stator contact portion 397 of the bracket 380 may be formed by cutting an inner surface of an end of the bridge 390 in a thickness direction thereof.

Each of the plurality of bridges 390 of the bracket 380 is provided with an end contact portion 402 that is brought into contact with an end of the stator 280. Accordingly, when the stator 280 and the bracket 380 are coupled to each other, the end of the stator 280 and the end contact portion 402 are brought into contact with each other, allowing them to be constrained in the axial direction. This may reduce generation of an axial clearance of the bracket 380. Thus, a coupling force between the stator 280 and the bracket 380 may be increased.

The stator contact portion 397 of the bracket 380 is provided with, for example, a coupling protrusion accommodating portion 399 in which the coupling protrusion 291 of the stator 280 is accommodated. The coupling protrusion accommodating portion 399 has a cross-sectional shape that corresponds to a cross-sectional shape of the coupling protrusion 291, for example. The coupling protrusion accommodating portion 399 may have, for example, an arcuate cross section. Accordingly, relative movement (clearance) between the stator 280 and the bracket 380 in the circumferential direction may be suppressed. This may allow a coupling force between the stator 280 and the bracket 380 (e.g., the bridge 390) to be increased.

Meanwhile, each of the plurality of bridges 390 (e.g., the protruding end 395) of the bracket 380 is provided at its outer surface with a leg contact portion 405. The leg contact portions 405 are in contact with a plurality of legs 255 of the outer housing 251, respectively. The leg contact portion 405 of the bracket 380 has a cross section that corresponds to a cross section of the leg 255 of the outer housing 251. Accordingly, a coupling force between the bracket 380 and the outer housing 251 may be enhanced.

Figure 7:
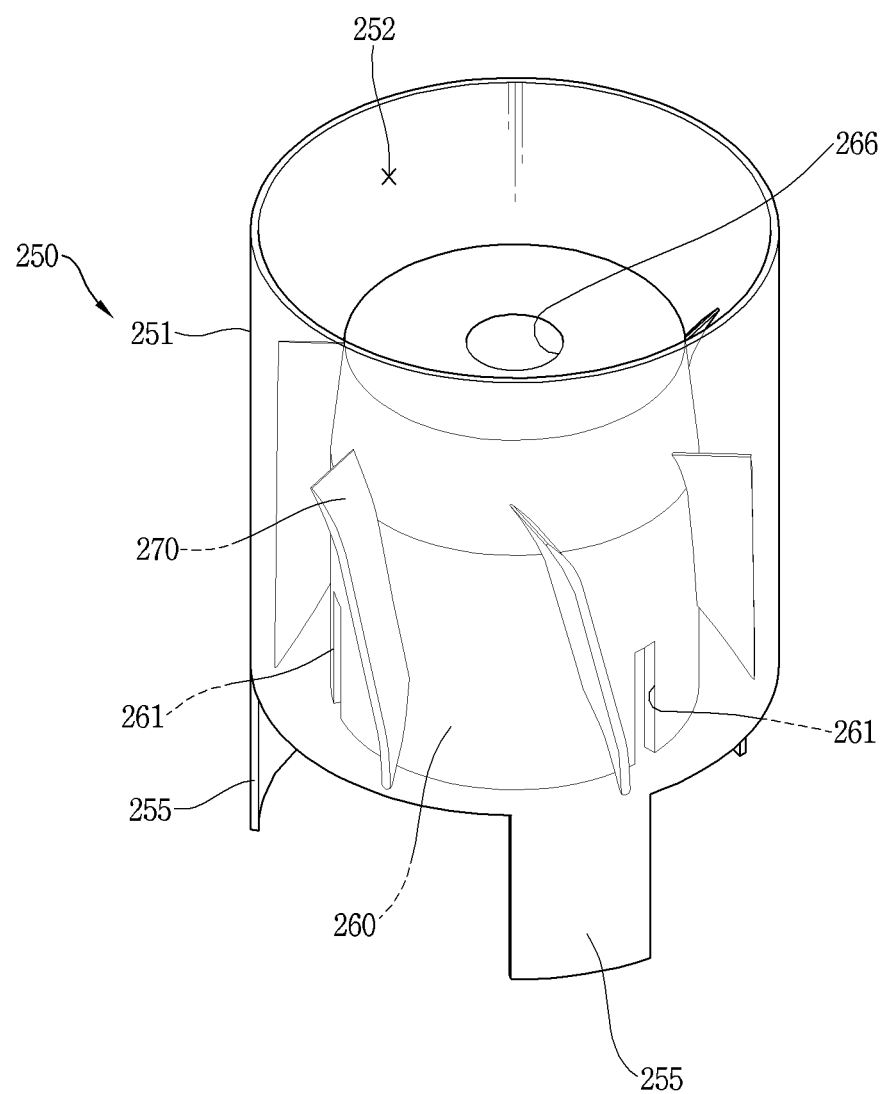
FIG. 7 is a perspective view of a housing of FIG. 3.

FIG. 7 is a perspective view of the housing of FIG. 3. As illustrated in FIG. 7, the housing 250 includes the outer housing 251 and the inner housing 260 that are disposed concentrically with each other. The plurality of legs 255 protruding along the axial direction is provided at an outlet end (e.g., right end in FIG. 3) of the outer housing 251 along a flow (movement) direction of air moved by the impeller 210.

The plurality of legs 255 of the outer housing 251 is spaced apart from one another by a predetermined distance along the circumferential direction. The plurality of legs 255 is configured to have the same width. Both sides of the plurality of legs 255 are disposed to be parallel along the axial direction. The plurality of legs 255 has a predetermined width along the circumferential direction of the outer housing 251, so as to each have an arcuate cross section, for example.

Meanwhile, the inner housing 260 is provided with a slit 261 in which the coupling protrusion 291 is accommodated when the stator 280 is coupled thereto. Accordingly, when the inner housing 260 and the stator 280 are coupled to each other, the inner housing 260 and the stator 280 are constrained in the circumferential direction, thereby suppressing generation of a clearance along a circumferential direction of the stator 280.

The slit 261 extends from an outlet end (e.g., right end in FIG. 3) of the inner housing 260 along the axial direction, for example. The slit 261 may be provided in plurality so as to be spaced apart from one another along the axial direction.

Figure 8:
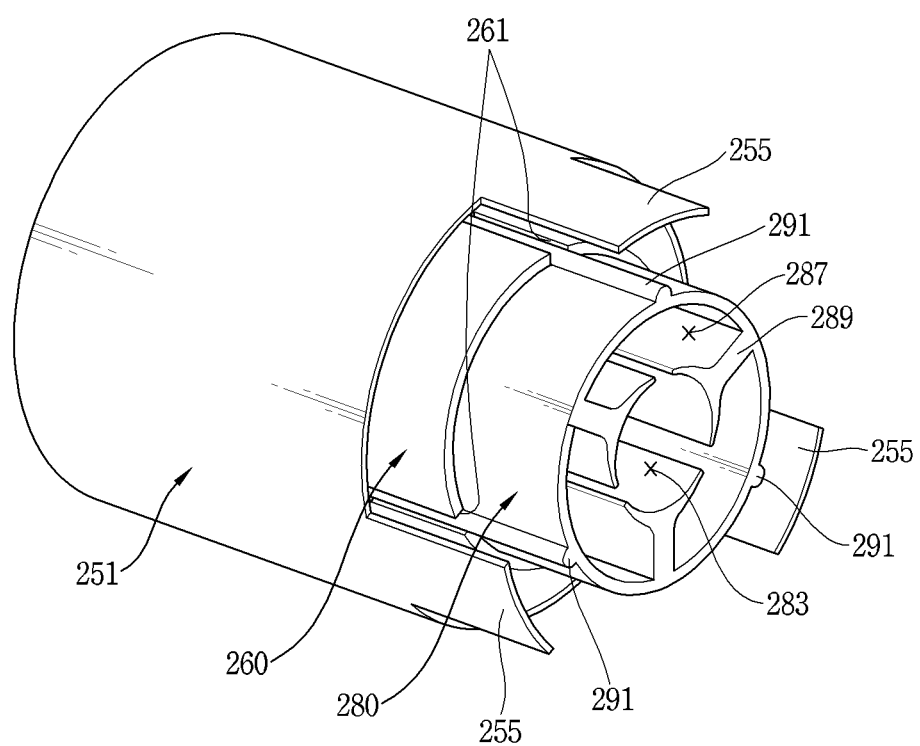
FIG. 8 illustrates a coupled state between a housing and a stator core of FIG. 3.

FIG. 8 illustrates a coupled state between the housing and the stator core of FIG. 3. As illustrated in FIG. 8, the slits 261 are formed at positions corresponding to the respective coupling protrusions 291 of the stator core 281.

A length of the slit 261 may be, for example, 40 to 60% of the coupling protrusion 291.

An inner diameter of the inner housing 260 corresponds to the outer diameter of the stator core 281. An inner surface of the inner housing 260 may be brought into contact with the outer surface of the stator core 281. When inserting the stator core 281 into the inner housing 260 while the coupling protrusions 291 of the stator core 281 are disposed to correspond to the respective slits 261 of the inner housing 260, the coupling protrusions 291 are inserted into the respective slits 261.

Once the stator core 281 is inserted into the inner housing 260, another side (e.g., right side in FIG. 8) of the stator core 281 is exposed to the inner housing 260.

In addition, a left side (or region) of the coupling protrusion 291 of the stator core 281 is inserted into the slit 261 of the inner housing 260, and a right side thereof is exposed to the outside.

Figure 9:
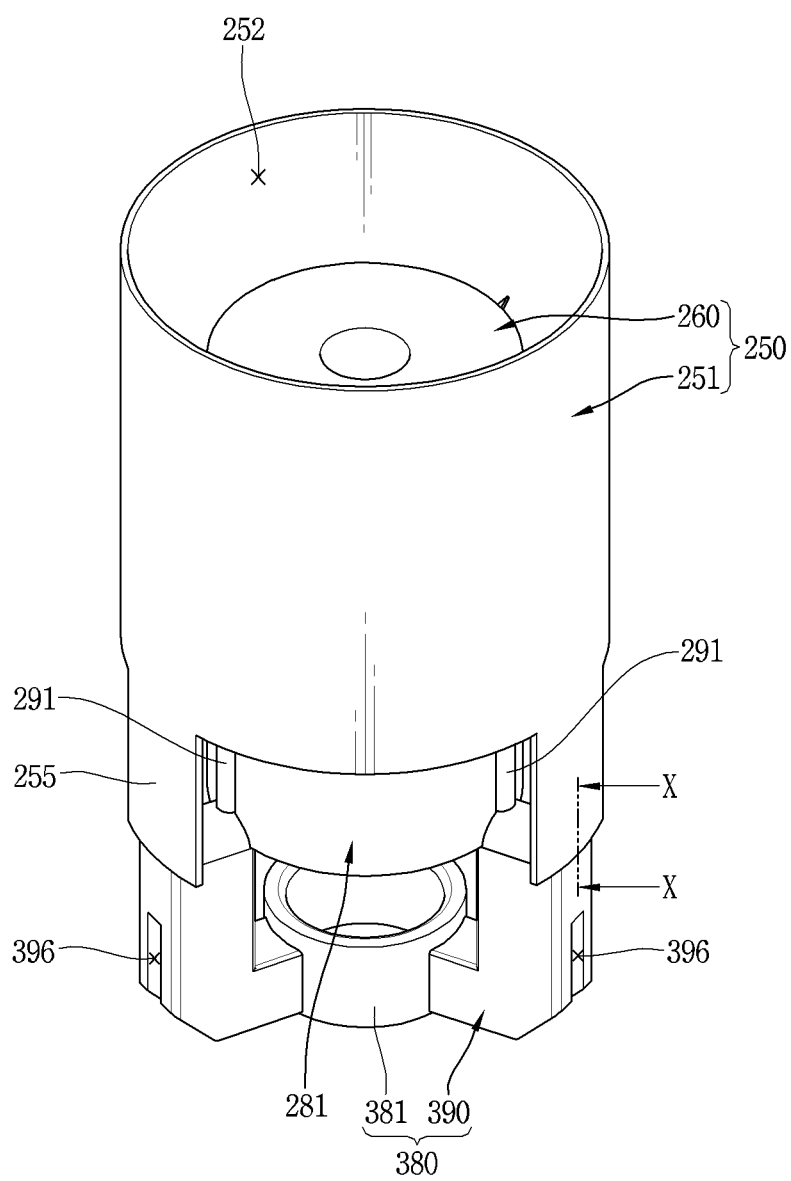
FIG. 9 is a view for explaining a coupling relationship between the housing, the stator core, and a bracket of FIG. 8.
Figure 10:
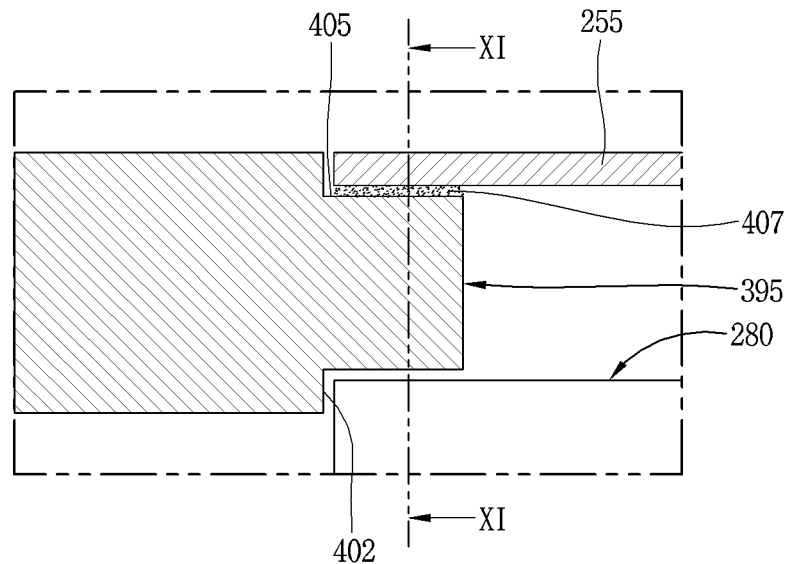
FIG. 10 is an axial cross-sectional view illustrating a coupled state between a leg and the bracket of FIG. 9.
Figure 11:
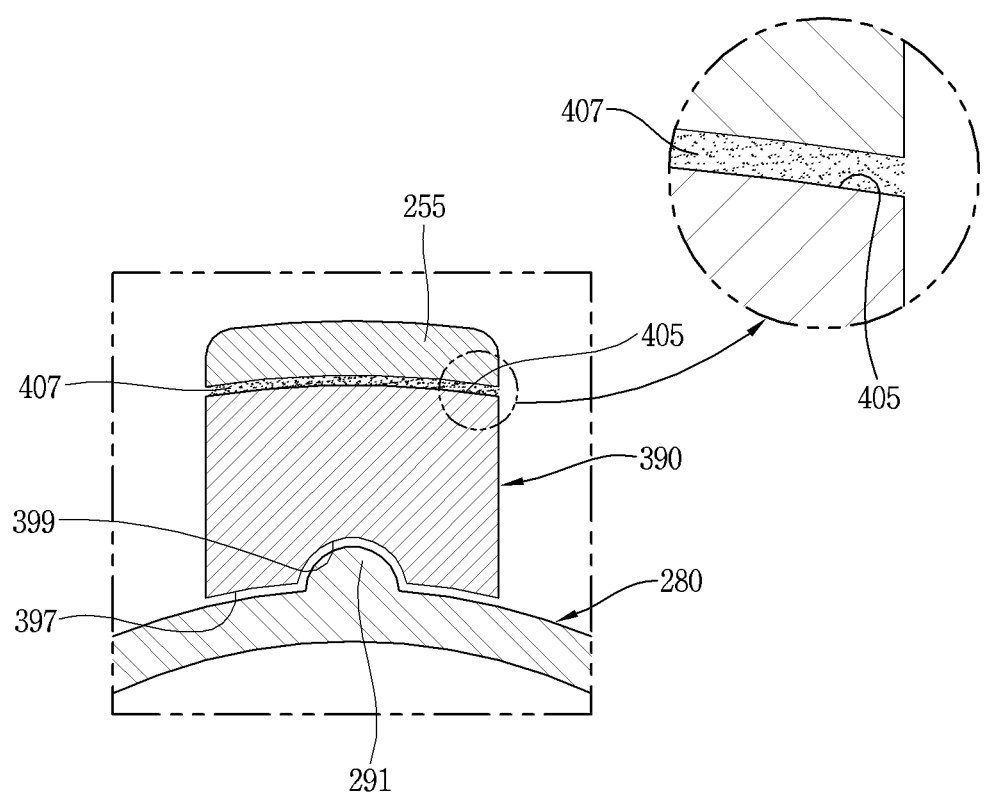
FIG. 11 is a horizontal cross-sectional view illustrating a coupled state between the leg and the bracket of FIG. 10.

FIG. 9 is a view for explaining a coupling relationship between the housing, the stator core, and the bracket of FIG. 8, FIG. 10 is an axial cross-sectional view illustrating a coupled state between the leg and the bracket of FIG. 9, and FIG. 11 is a horizontal cross-sectional view illustrating a coupled state between the leg and bracket of FIG. 10. As illustrated in FIG. 9, when coupling the bracket 380 to the inner housing 260 and the stator core 281 that are coupled to each other, the coupling protrusion accommodating portions 399 of the plurality of bridges 390 of the bracket 380 are disposed to correspond to the respective coupling protrusions 291 of the stator core 281.

Here, the plurality of legs 255 of the outer housing 251 is disposed to correspond to the respective bridges 390 of the bracket 380. Next, the bracket 380 is pressed toward the stator core 281 along the axial direction. Then, each of the stator contact portions 397 of the plurality of bridges 390 is in contact with the outer surface of the stator core 281, and the plurality of legs 255 of the outer housing 251 is in contact with the respective leg contact portions 405 of the plurality of bridges 390.

Each of the coupling protrusions 291 of the stator core 281 is moved relative to the axial direction while being accommodated in the coupling protrusion accommodating portion 399 of the corresponding bridge 390 of the bracket 380.

When the bracket 380 is pressed toward the stator core 281 along the axial direction, the end contact portions 402 of the plurality of bridges 390 of the bracket 380 are brought into contact with the end of the stator core 281. Then, axial movement of the bracket 380 is stopped.

With a left side (or region) of the stator core 281 inserted, the bracket 380 may be coupled to a right end of the stator core 281.

Here, prior to coupling the bracket 380 and the stator core 281 to each other, an adhesive 407 may be applied to any one of contact surfaces between each leg contact portion 405 of the bracket 380 and each leg 255. The adhesive 407 may be applied to an end of the leg 255. The adhesive 407 may be applied to the leg contact portion 405 of the bracket 380.

As illustrated in FIGS. 10 and 11, by applying the adhesive 407 between the plurality of legs 255 and the plurality of leg contact portions 405 of the bracket 380 prior to coupling them together, the plurality of legs 255 and the plurality of leg contact portions 405 may be firmly and integrally coupled to each other, respectively. This may allow the outer housing 251 and the bracket 380 to be more securely coupled to each other.

Figure 12:
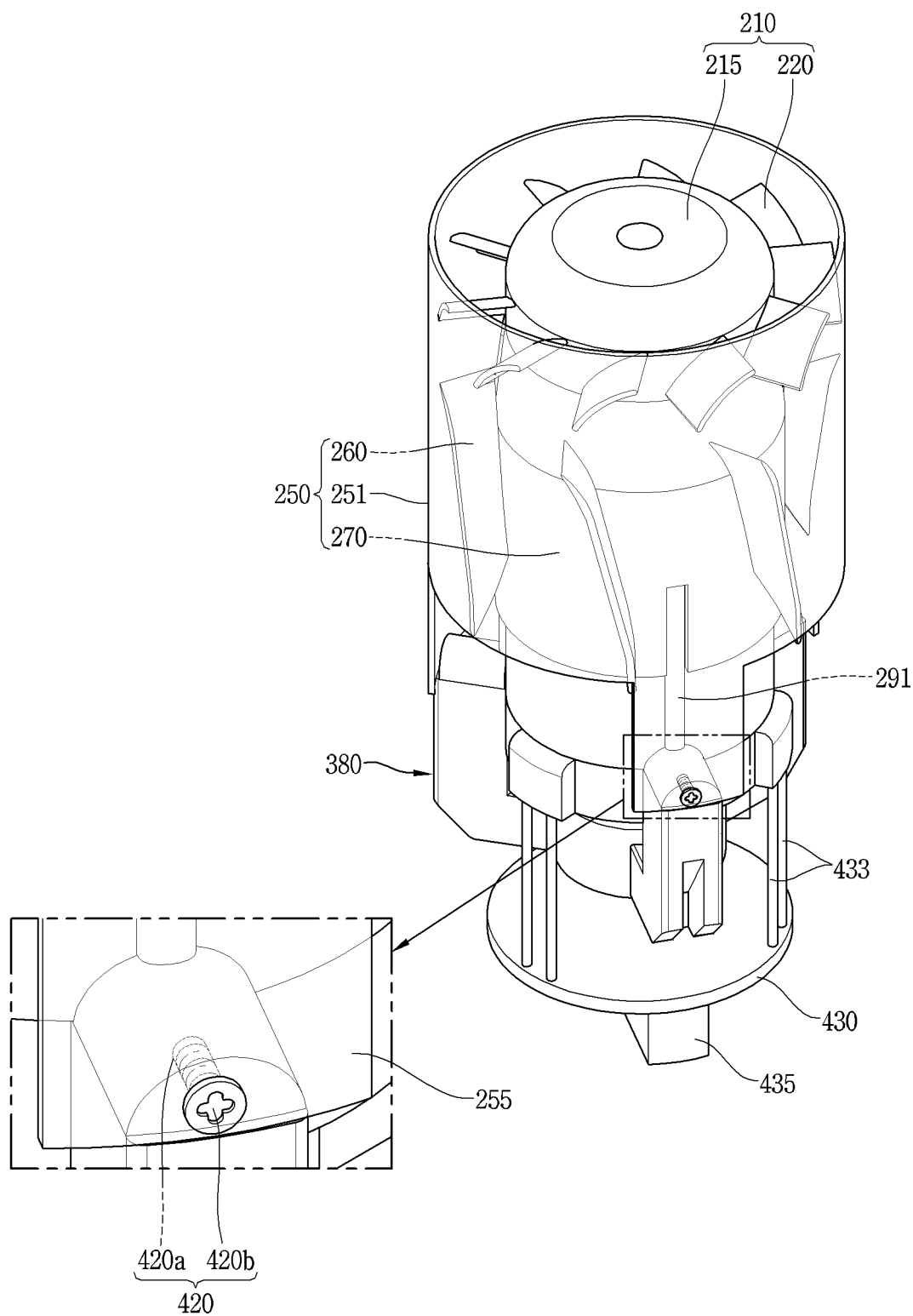
FIG. 12 is a perspective view of an electric motor assembly according to another implementation of the present disclosure.
Figure 13:
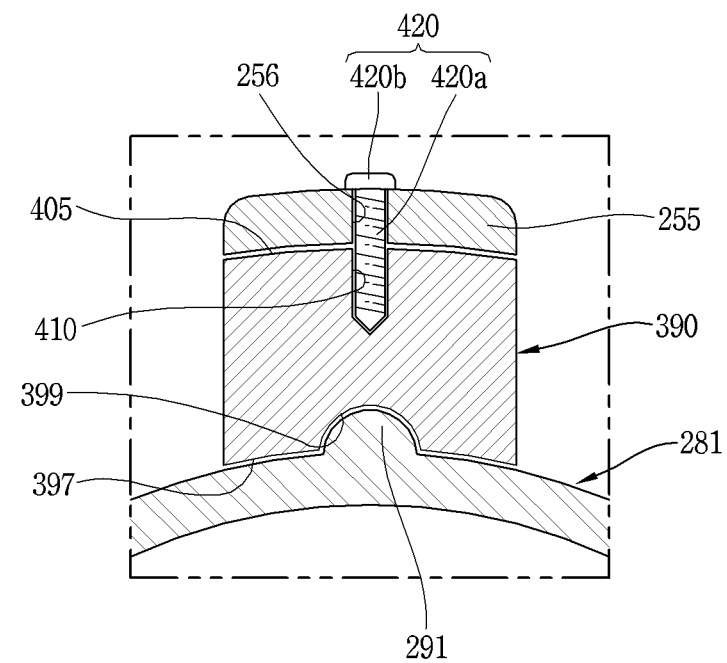
FIG. 13 is a cross-sectional view illustrating an area of a fastening member of FIG. 12.

FIG. 12 is a perspective view of an electric motor assembly according to another implementation of the present disclosure, and FIG. 13 is a cross-sectional view of a fastening member of FIG. 12. As illustrated in FIG. 12, the electric motor assembly 200 of this implementation includes an impeller 210, a housing 250, a stator 280, a rotor 340, a first bearing 360a, a second bearing 360b, a bracket 380, and a fastening member 420.

The housing 250 includes the outer housing 251 and the inner housing 260 that are disposed concentrically with each other. One side of the stator 280 is inserted into the inner housing 260. The plurality of coupling protrusions 291 is provided on an outer surface of the stator core 281. The plurality of slits 261 in which the plurality of coupling protrusions 291 is accommodated is formed on the inner housing 260. The rotor 340 is rotatably accommodated in the stator 280.

The first bearing 360a is provided at one side of the rotor 340 and the second bearing 360b is provided at another side thereof. The first bearing 360a is accommodated in the inner housing 260, and the second bearing 360b is accommodated in the bracket 380.

The bracket 380 is provided with the bearing accommodation portion 381 in which the bearing 360 is accommodated, and the plurality of bridges 390 axially extending from the bearing accommodation portion 381. Each of the plurality of bridges 390 of the bracket 380 is provided on its inner surface with the stator contact portion 397 that is brought into contact with the stator core 281. Each of the plurality of bridges 390 of the bracket 380 is provided on its outer surface with the leg contact portion 405 that is brought into contact with the leg 255.

Meanwhile, in this implementation, the outer housing 251 and the bracket 380 may be configured to be fixedly coupled by the fastening member 420. This may allow the outer housing 251 and the bracket 380 to be securely coupled to each other.

The fastening member 420 may be configured as, for example, a bolt or screw having an external (male) thread. The fastening member 420 includes, for example, a body 420a having an external thread and a head 420b formed at an end of the body 420a in an extended manner. An insertion groove through which a tool is inserted is formed on the head 420b.

A fastening member insertion hole 256 in which the fastening member 420 is inserted is formed through each of the plurality of legs 255 of the outer housing 251.

Each of the plurality of bridges 390 of the bracket 380 is provided with a fastening member coupling portion 410 to which the fastening member 420 is coupled.

When coupling the housing 250, the stator 280, and the bracket 380 to each other, the stator core 281 is disposed at an outlet end of the inner housing 260 to make the coupling protrusion 291 disposed at an entry (or entrance) of the slit 261 of the inner housing 260. Then, the stator core 281 is pressed in the axial direction to be inserted into the inner housing 260. Next, the plurality of bridges 390 of the bracket 380 is disposed to correspond to the respective coupling protrusions 291. When pressed in the axial direction, the coupling protrusions 291 move relative to the axial direction while being accommodated in the respective coupling protrusion accommodating portions 399.

When the end contact portions 402 are brought into contact with an end of the stator core 281, the plurality of legs 255 is brought into contact with the respective leg contact portions 405 of the plurality of bridges 390.

The fastening member insertion holes 256 of the plurality of legs 255 and the fastening member coupling portions 410 of the plurality of bridges 390 communicate with each other, respectively.

When rotating the fastening members 420 after inserting the fastening members 420 into the respective fastening member insertion holes 256 in communication, the external threads of the fastening members 420 are inserted into the fastening member coupling portions 410, respectively, allowing them to be coupled to each other. This may allow the plurality of legs 255 to be firmly coupled to the respective bridges 390 in a fixed manner. Accordingly, the plurality of legs 255 and the plurality of bridges 390 may be fixed in both the axial and circumferential directions.

Figure 14:
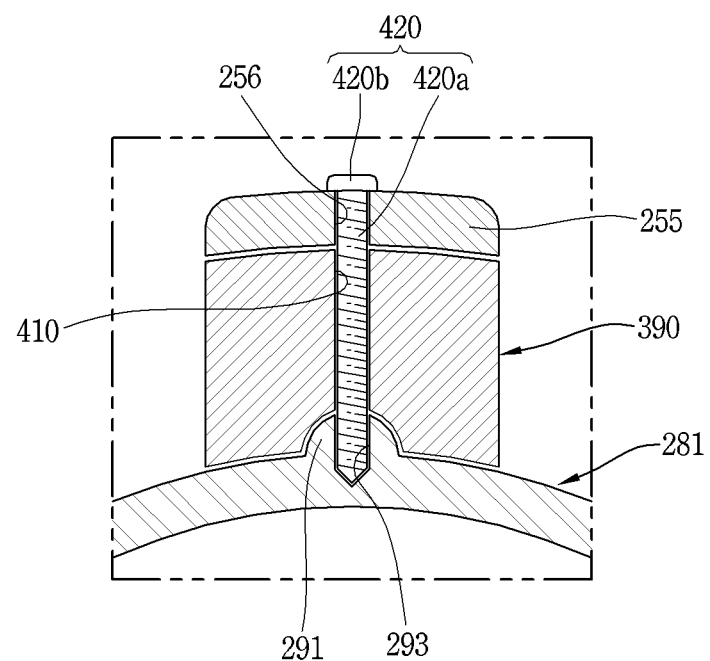
FIG. 14 illustrates a modified example of the fastening member of FIG. 13.

In addition, as the coupling protrusion 291 and the coupling protrusion accommodating portion 399 are engaged with each other along a circumferential direction of the stator core 281, a circumferential clearance may be reduced. Further, an axial clearance may be reduced by the end of the stator core 281 and the end contact portions 402 of the plurality of bridges 390. FIG. 14 illustrates a modified example of the fastening member of FIG. 13. As illustrated in FIG. 14, the plurality of legs 255 of the outer housing 251, the plurality of bridges 390 of the bracket 380, and the stator core 281 may be integrally fixed and coupled to each other by the fastening member 420.

The fastening member 420 may be configured to be coupled to all of the leg 255, the bridge 390, and the stator core 281. This may allow the outer housing 251, the bracket 380, and the stator 280 to be more securely coupled to each other.

In this implementation, the fastening member 420 may have a relatively long length. The fastening member insertion holes 256 may be formed through the plurality of legs 255, respectively, so as to allow the respective fastening members 420 to be inserted therein.

Each of the plurality of bridges 390 may be provided with the fastening member coupling portion 410 to which the fastening member 420 is coupled. The fastening member coupling portion 410 may be formed through the bridge 390 in a thickness direction (radial direction).

The stator core 281 may be provided with a plurality of fastening member coupling portions 293 to which ends of the fastening members 420 that have passed through the respective bridges 390 are coupled, respectively.

When fixing the outer housing 251, the bracket 380, and the stator core 281 using the fastening member 420, one side of the stator core 281 is insertedly coupled to the inside of the inner housing 260. Then, the bracket 380 is disposed at another side of the stator core 281 so as to allow the plurality of legs 255, the stator core 281 and the bracket 380 to be coupled to predetermined or preset positions, respectively.

When the bracket 380 is coupled the stator core 281, the fastening member insertion hole 256 of the leg 255, the fastening member coupling portion 410 of the bridge 390, and the fastening member coupling portion 281 of the stator core 293 are aligned along the radial direction, allowing them to communicate with each other.

Here, when the fastening members 420 are inserted into the respective fastening member insertion holes 256 of the plurality of legs 255 and are then relatively rotated, the fastening members 420 are coupled to the respective fastening member coupling portions 410 of the plurality of bridges 390.

When the fastening member 420 is continuously rotated, an end of the fastening member 420 may be coupled to the fastening member coupling portion 293 of the stator core 281.

With this configuration, as the leg 255, the bridge 390, and the stator core 281 are coupled all together by the fastening member 420, the outer housing 251, the bracket 380, and the stator core 281 may be securely coupled to each other by the fastening member 420.

In particular, a clearance, generated by external forces acting in various directions including axial and circumferential directions of the outer housing 251, the stator core 281, and the bracket 380, may be significantly reduced. This may allow an axial gap between the stator 280 and the rotor 340 to be securely maintained. Accordingly, a decrease in output of the electric motor assembly 200, due to non-uniformity of the air gap between the stator 280 and the rotor 340, may be prevented or reduced. Thus, the output of the electric motor assembly 200 may be stably maintained at a relatively high level.

In addition, as lateral displacement of the rotor 340 is significantly reduced, abrasion or wear of the first bearing 360*a* and the second bearing 360*b* may be remarkably reduced. Accordingly, the lifespan of the first bearing 360*a* and the second bearing 360*b* may be greatly increased. Also, generation of vibration and noise when the rotor 340 rotates may be significantly reduced.

Further, an excessive increase in radial size of the outer housing 251 and/or the bracket 380 compared to a size of the stator 280 may not be caused. As an outer size of the electric motor assembly 200 is limited, a limitation or restriction in size of the stator 280 and the rotor 340 may be reduced, thereby providing a sufficient capacity for the electric motor assembly 200.

Figure 15:
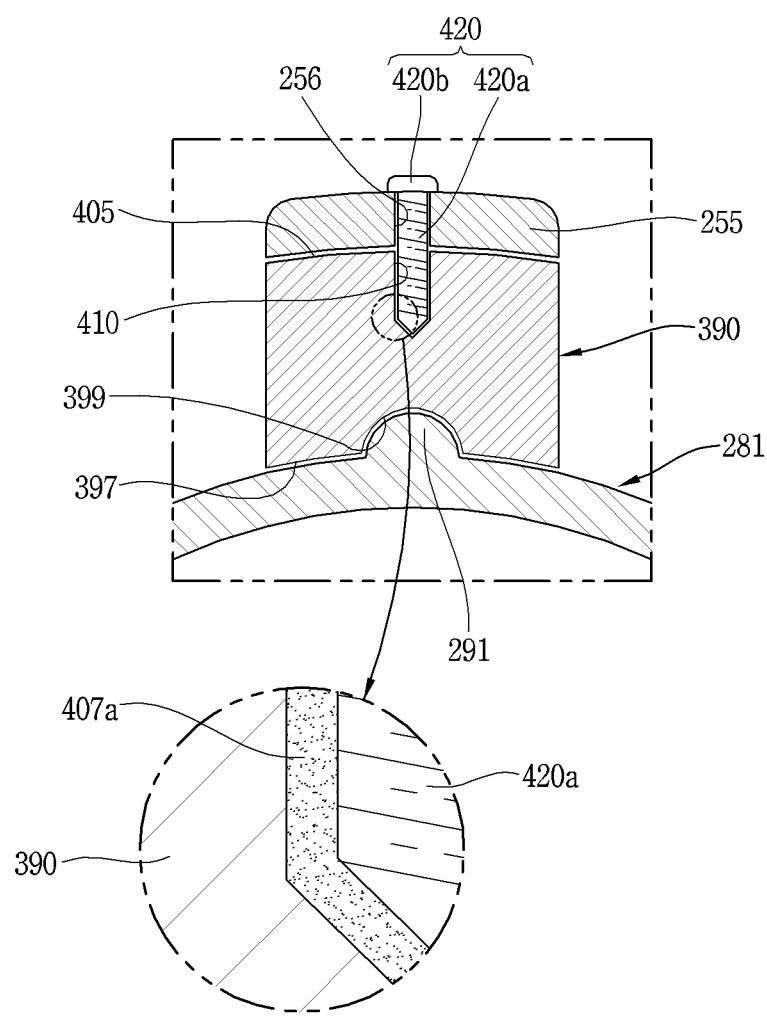
FIG. 15 illustrates a coupled state between the fastening member and an adhesive of FIG. 14.

FIG. 15 is a coupled state between the fastening member and the adhesive of FIG. 14.

As illustrated in FIG. 15, the electric motor assembly 200 of this implementation includes the impeller 210, the housing 250, the stator 280, the rotor 340, the first bearing 360*a*, the second bearing 360*b*, and the bracket 380.

In this implementation, the plurality of legs 255 of the outer housing 251 and the plurality of bridges 390 of the bracket 380 may be fixedly coupled by the fastening members 420, respectively. The fastening member insertion holes 256 are formed through the respective legs 255 of the outer housing 251 so as to allow the fastening members 420 to be inserted therein, respectively. Each of the plurality of bridges 390 of the bracket 380 is provided with the fastening member coupling portion 410 to which the fastening member 420 is coupled.

Meanwhile, in this implementation, as illustrated in FIG. 15, an adhesive 407*a* may be disposed between the fastening member 420, the fastening member insertion hole 256, and the fastening member coupling portion 410.

The adhesive 407*a* may have a coupling (or adhesion) force sufficient to securely maintain coupling of the fastening member 420, for example. This may prevent the fastening member 420 from being unexpectedly released or loosened by an external force after coupling of the fastening member 420.

Instead of coupling the fastening member 420 using a permanent magnet, the fastening member 420 may be configured to be separated or detached by the adhesive 407*a*. Accordingly, when coupling the plurality of legs 255 of the outer housing 251, the stator core 281, and the bracket 380 using the fastening member 420, the adhesive 407*a* may be applied to the coupling member 420 and/or the coupling member coupling portion 410 before coupling them by the fastening member 420.

Figure 16:
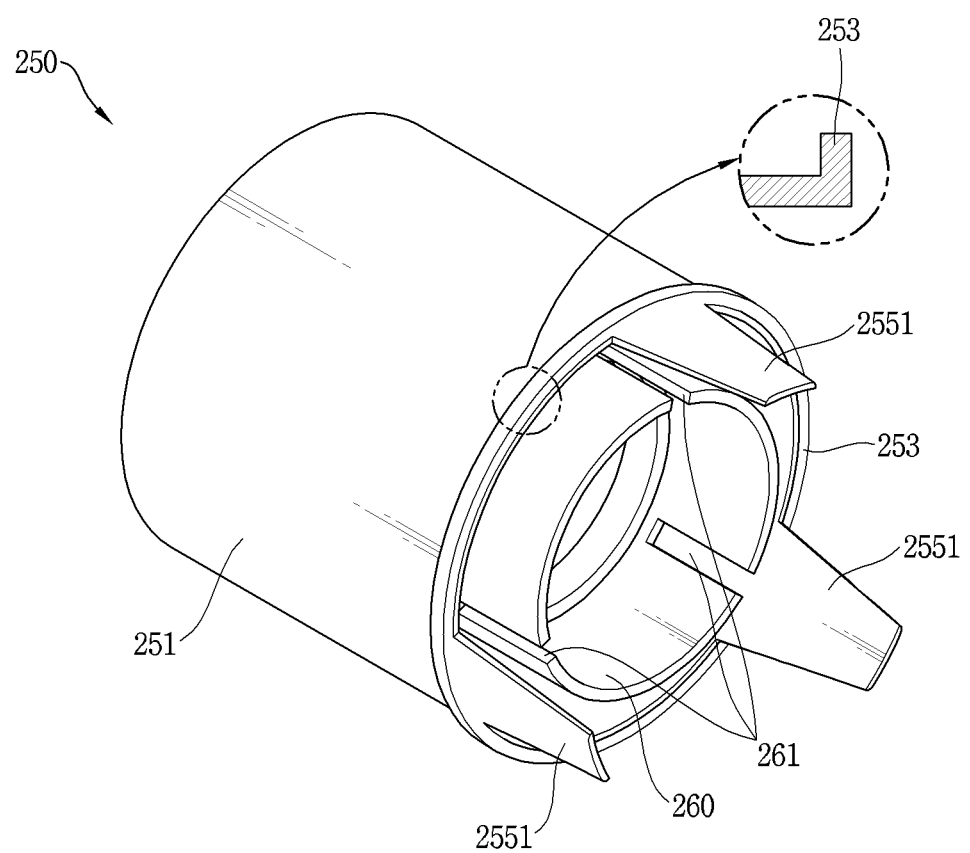
FIG. 16 illustrates a modified example of a leg of the housing of FIG. 3.

FIG. 16 illustrates a modified example of a leg of the housing of FIG. 3. As illustrated in FIG. 16, the electric motor assembly 200 of this implementation includes the housing 250 in which the impeller 210 is accommodated.

The housing 250 includes the outer housing 251 and the inner housing 260 that are disposed concentrically with each other. The inner housing 260 and the outer housing 251 are integrally connected by the plurality of vanes 270.

Meanwhile, a plurality of legs 2551 that protrudes in the axial direction is provided at the outlet end of the outer housing 251. Each of the plurality of legs 2551 has an arcuate cross section that corresponds to a circumference of the outer housing 251. In this implementation, each of the plurality of legs 2551 has a cross section that gradually decreases along the axial direction.

More specifically, the plurality of legs 2551 has a relatively large (or wide) width at an end of the outer housing 251 and a relatively small (or thin) width at a free end along a protruding direction thereof. Accordingly, deformation of the plurality of legs 2551 may be suppressed.

The outer housing 251 is provided with a support ring 253 that protrudes from an outer surface thereof and extends along the circumferential direction. The support ring 253 is formed in a circular ring shape. The support ring 253 may have, for example, a rectangular cross section. Accordingly, support strength (rigidity) of the outer housing 251 may be increased.

The support ring 253 is provided at the outlet end of the outer housing 251. Accordingly, deformation of the plurality of legs 2551 may be suppressed. As a result, the plurality of legs 2551 and the bracket 380 may be securely coupled to each other.

With this configuration, the first bearing 360*a* is accommodatingly coupled to the inside of the inner housing 260. While the coupling protrusions 291 are disposed to correspond to the respective slits 261 of the inner housing 260, the stator 280 is inserted into the inner housing 260.

When the stator 280 is coupled to the inner housing 260, the rotor 340 is accommodatingly coupled to an inside of the stator 280. Once the rotor 340 is coupled to the stator 280, one (left) end of the rotating shaft 341 protrudes to the outside of the inner housing 260 through the rotating shaft hole 266. The impeller 210 is coupled to an end of the rotating shaft 341 protruding to an inside of the outer housing 251.

The second bearing 360*b* is accommodatingly coupled to an inside of the bearing accommodation portion 381 of the bracket 380. After coupling another (right) end of the rotating shaft 341 to the second bearing 360*b*, the coupling protrusion accommodating portions 399 of the plurality of bridges 390 of the bracket 380 are disposed to correspond to the respective coupling protrusions 291 of the stator 280.

Then, when the stator 280 and the bracket 380 are pressed to be close to each other, the end contact portions 402 of the plurality of bridges 390 of the bracket 380 are brought into contact with the end of the stator core 281, and can no longer be moved.

Here, the plurality of legs 2551 and the plurality of bridges 390 of the bracket 380 may be adhesively coupled to each other by the adhesive 407, or integrally coupled to each other by the fastening member 420.

In some implementations, when drying or styling hair with the hair dryer, a user may use a signal input portion to apply power to the electric motor assembly 200 while holding the handle 150.

In the hair dryer according to these implementations, the electric motor assembly 200 has a small radial size, and thus the handle 150 has a small outer diameter (outer width), allowing the hair dryer to be easily gripped and used. In particular, even a user with a relatively small hand may easily grip the handle, allowing the user to conveniently use the hair dryer without feeling discomfort.

When power is applied to the electric motor assembly 200, a magnetic field formed by the stator 280 and a magnetic field formed by the permanent magnet 345 interact with each other, causing the rotor 340 and the impeller 210 to be rotated with respect to the rotating shaft 341.

Here, both sides of the rotor 340 are supported by the first bearing 360a and the second bearing 360b disposed at both sides thereof, reducing lateral displacement (vibration) of the rotor 340 (permanent magnet 345) and the rotating shaft 341. As a result, an air gap between the stator 280 and the rotor 340 may be uniformly maintained. This may result in reducing or suppressing vibration and noise generated when the rotor 340 rotates. In addition, an output of the electric motor assembly 200 may be increased.

Air suctioned into the handle 150 through the air inlet port 160 as the impeller 210 rotates flows into the air flow path 130 inside the hair dryer body 100.

As illustrated in FIG. 1, air moved to the air flow path 130 is heated to a preset temperature by the electric heater 140 when the electric heater 140 is operated, and is then discharged to the outside through the air outlet port 135.

When air is discharged through the air outlet port 135, air may be introduced through the penetrating portion 125 to merge with the air discharged through the air outlet port 135. When air is discharged through the air outlet port 135, air around the air outlet port 135 of the hair dryer body 100 and the air discharged through the air outlet port 135 may come or join together.

Figure 17:
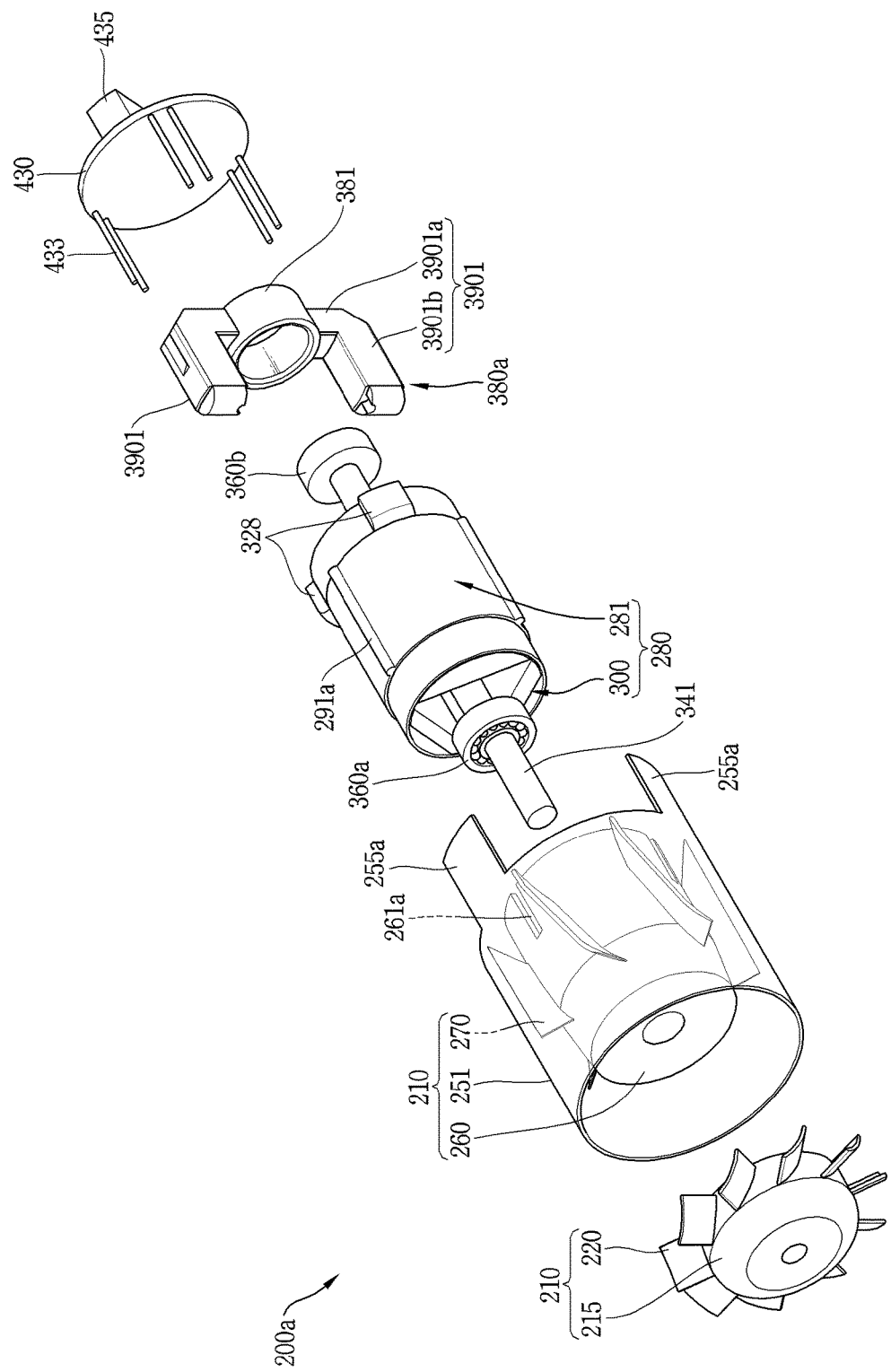
FIG. 17 is an exploded perspective view of an electric motor assembly according to yet another implementation of the present disclosure.
Figure 18:
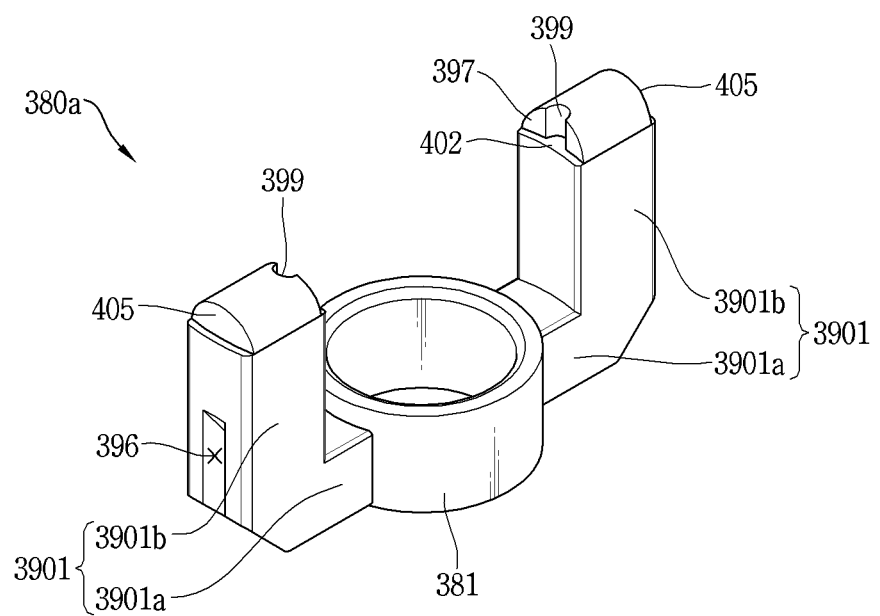
FIG. 18 is a perspective of a bracket of FIG. 17.

FIG. 17 is an exploded perspective view of an electric motor assembly according to another implementation of the present disclosure, and FIG. 18 is a perspective view of a bracket of FIG. 17. As illustrated in FIG. 17, an electric motor assembly 200a of this implementation includes an impeller 210, a housing 250, a stator 280, a rotor 340, a first bearing 360a, a second bearing 360b, and a bracket 380a.

The housing 250 includes an outer housing 251 and an inner housing 260 that are disposed concentrically with each other. A plurality of vanes 270 is provided between the inner housing 260 and the outer housing 251. A plurality of legs 255a protruding in an axial direction is provided at an outlet end of the outer housing 251. In this implementation, the plurality of legs 255a of the outer housing 251 is two in number.

One side of the stator 280 is inserted into the inner housing 260. The rotor 340 is accommodated in the stator 280 to be rotatable with respect to a rotating shaft 341. The first bearing 360a is provided at one side of the rotor 340, and the second bearing 360b is provided at another side of the rotor 340. The first bearing 360a is provided inside the inner housing 260.

The second bearing 360b is provided inside the bracket 380a.

The stator 280 is provided with a stator core 281 and a stator coil 300 wound on the stator core 281. The stator core 281 is provided therein with a rotor receiving hole 285 and formed by stacking in an insulating manner a plurality of electrical steel plates 283 having a plurality of slots 287 and a plurality of teeth 289 in a circumference of the rotor receiving hole 285.

A plurality of coupling protrusions 291a that protrude in a radial direction and extend in the axial direction is formed at an outer surface of the stator core 281.

In this implementation, two coupling protrusions 291a are provided on the outer surface of the stator core 281. The plurality of coupling protrusions 291a of the stator core 281 is disposed at an equal interval along a circumferential direction of the stator core 281. In this implementation, the two coupling protrusions 291a are disposed to be 180 degrees apart from each other.

The inner housing 260 is provided with a plurality of slits 261a in which the plurality of coupling protrusions 291a is accommodated, respectively. The plurality of slits 261a of the inner housing 260 is two in number. The plurality of slits 261a is provided inside the plurality of legs 255a, respectively. The plurality of slits 261a of the inner housing 260 axially extend from an outlet end (e.g., right end in FIG. 17) of the inner housing 260.

Meanwhile, as illustrated in FIG. 18, the bracket 380a is provided with a bearing accommodation portion 381 in which the bearing 360 (e.g., the second bearing 360b) is accommodated, and a plurality of bridges 3901 that axially extends from the bearing accommodation portion 381.

The plurality of bridges 3901 of the bracket 380a of this implementation is two in number. In this implementation, the plurality of legs 255a and the plurality of bridges 3901 may have a relatively large cross section than the plurality of legs 275 and the plurality of bridges 390 of the previous implementation, which are respectively configured as three, so as to achieve an appropriate coupling force.

Each of the plurality of bridges 3901 includes a radial section 3901a that radially protrudes from the bearing accommodation portion 381 and an axial section 3901b that is bent from the radial section 3901a and extends in the axial direction.

Inner surfaces of the plurality of bridges 3901 may each have a radius of curvature corresponding to a radius of curvature of an outer diameter of the stator core 281, for example. The inner surfaces of the plurality of bridges 3901 may have, for example, arcuate cross sections, respectively.

Outer surfaces of the plurality of bridges 3901 may each have a radius of curvature corresponding to a radius of curvature of an outer diameter of the outer housing 251, for example. The outer surfaces of the plurality of bridges 3901 may have, for example, arcuate cross sections, respectively.

Each of the plurality of bridges 3901 is provided with a protruding end 395 having a cross section that gradually decreases along a protruding direction thereof, for example.

Each of the protruding ends 395 of the plurality of bridges 390 has, for example, an arcuate cross section with its center protruding along the axial direction. Accordingly, flow resistance of air moved by the impeller 210 may be reduced.

Stator contact portions 397 that are brought into contact with the outer surface of the stator core 281 are formed on the inner surfaces (e.g., inner surfaces of the protruding ends 395) of the plurality of bridges 3901, respectively.

Each of the stator contact portions 397 of the plurality of bridges 3901 is in surface contact with the outer surface of the stator 280 (stator core 281). Each of the stator contact portions 397 of the plurality of bridges 3901 is provided with a coupling protrusion accommodating portion 399 in which the coupling protrusion 291a of the stator 280 is accommodated. Accordingly, a circumferential clearance between the stator 280 and the bracket 380a may be suppressed. This may allow the stator 280 and the bracket 380a to be securely coupled to each other.

The stator contact portions 397 of the plurality of bridges 3901 are respectively formed by cutting the inner surfaces of the plurality of bridges 3901 along a thickness direction (radial direction) by a predetermined width (thickness). In addition or alternatively, the stator contact portions 397 of the plurality of bridges 3901 are formed by cutting the inner surfaces of the plurality of bridges 3901 along the axial direction by a predetermined length (width).

Accordingly, each of the plurality of bridges 3901 is provided with an end contact portion 402 in contact with an end surface of the stator 280 (stator core 281). As a result, an axial clearance between the stator 280 and the bracket 380a may be reduced. Thus, a coupling force between the stator 280 and the bracket 380a may be increased.

Each of the plurality of bridges 3901 is provided on its outer surface with a leg contact portion 405 that is brought into contact with the leg 255a. The leg contact portions 405 and the plurality of legs 255a are in surface contact with each other, respectively. The plurality of legs 255a and the plurality of bridges 3901 may be adhesively coupled to each other by an adhesive 407, respectively.

Alternatively or in addition, the plurality of legs 255a and the plurality of bridges 3901 may be coupled to each other by a fastening member 420, respectively.

With this configuration, when the stator 280 is inserted into the inner housing 260, the coupling protrusions 291a are accommodatingly coupled to an inside of the respective slits 261a. The rotor 340 is accommodatingly coupled to an inside of the stator 280, and the first bearing 360a is accommodatingly coupled to an inside of the bearing accommodation portion 381 of the inner housing 260. The impeller 210 is coupled to an end of the rotating shaft 341 protruding to an inside of the outer housing 251. The second bearing 360b is accommodatingly coupled to the inside of the bearing accommodation portion 381 of the bracket 380a. The coupling protrusions 291a are accommodatingly coupled to an inside of the respective coupling protrusion accommodating portions 399 of the plurality of bridges 3901 of the bracket 380a.

Here, the plurality of legs 255a and the plurality of bridges 3901 of the bracket 380a may be adhesively coupled to each other by the adhesive 407, or integrally coupled to each other by the fastening member 420.

Figure 19:
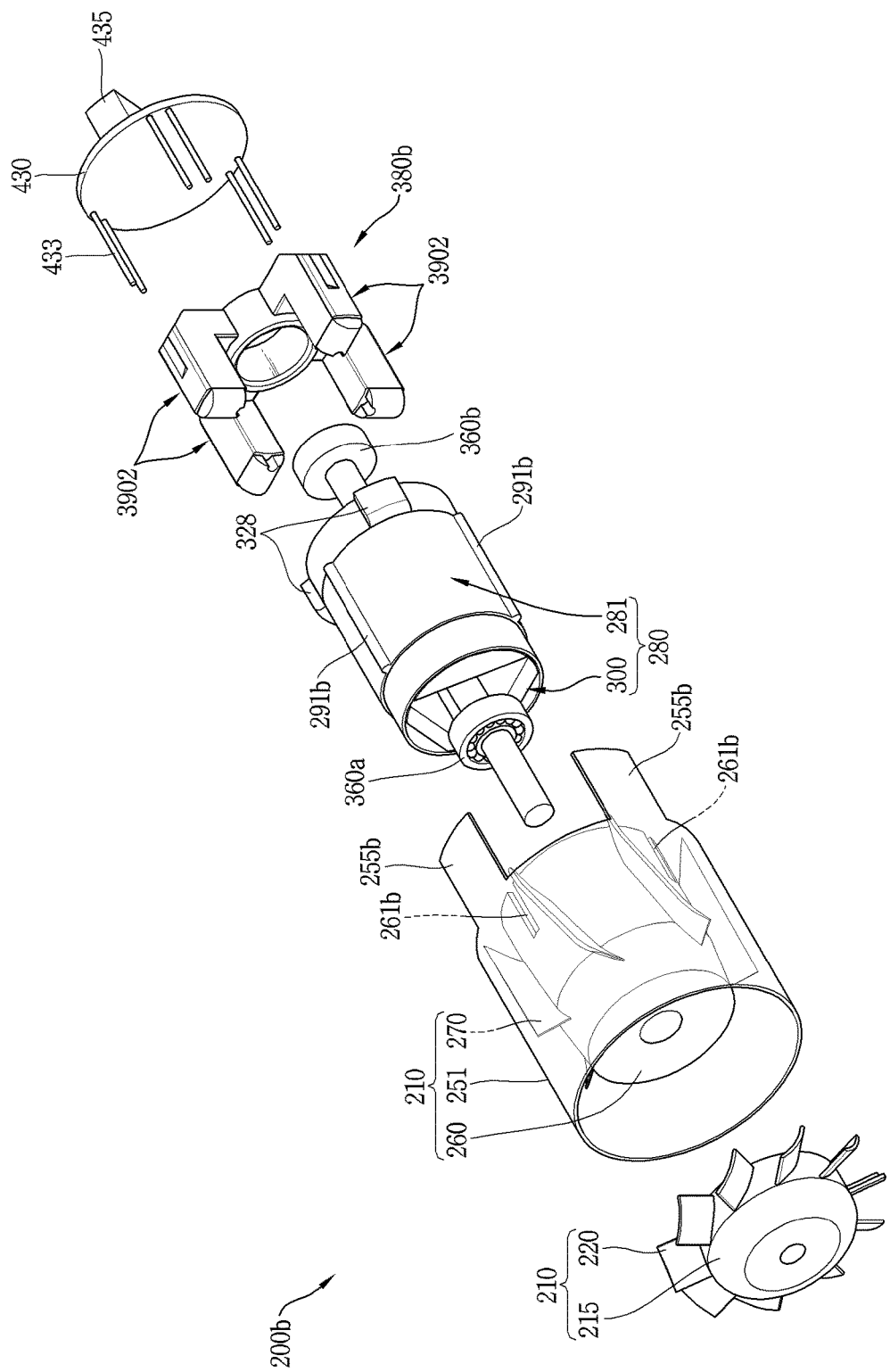
FIG. 19 is an exploded perspective view of an electric motor assembly according to yet another implementation of the present disclosure.
Figure 20:
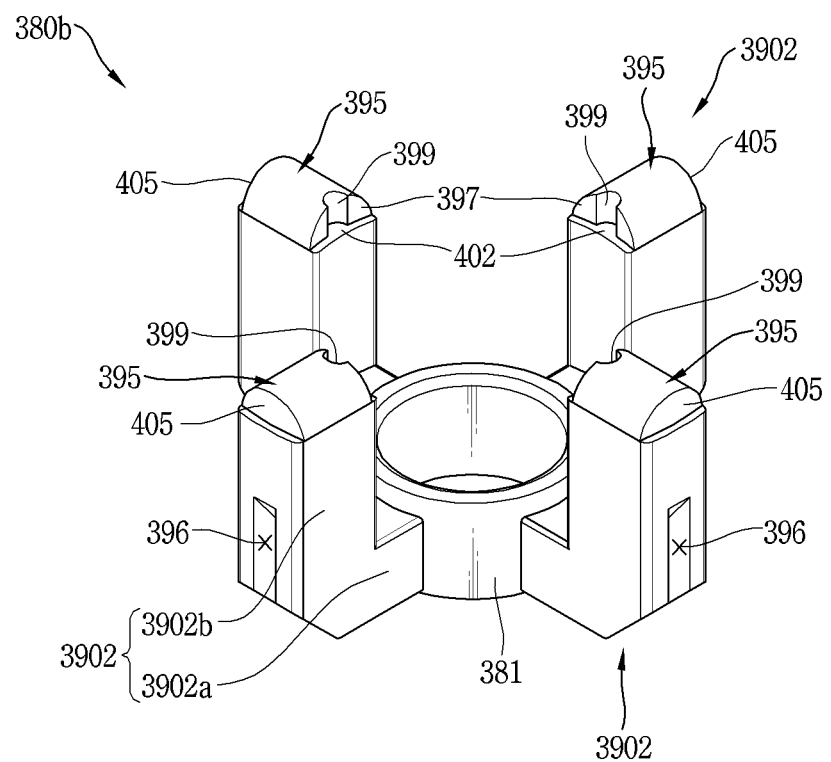
FIG. 20 is a perspective view of a bracket of FIG. 19.

FIG. 19 is an exploded perspective view of an electric motor assembly according to another implementation of the present disclosure, and FIG. 20 is a perspective view of a bracket of FIG. 19. As illustrated in FIG. 19, an electric motor assembly 200b of this implementation includes an impeller 210, a housing 250, a stator 280, a rotor 340, a first bearing 360a, a second bearing 360b, and a bracket 380b.

The housing 250 is provided with an outer housing 251 and an inner housing 260 that are disposed concentrically with each other. A plurality of vanes 270 is provided between the inner housing 260 and the outer housing 251.

A plurality of legs 255b protruding in an axial direction is provided at an outlet end of the outer housing 251. In this implementation, the plurality of legs 255b is four in number.

One side of the stator 280 is inserted into the inner housing 260. The rotor 340 is accommodated in the stator 280 to be rotatable with respect to a rotating shaft 341.

The first bearing 360a is provided at one side of the rotor 340, and the second bearing 360b is provided at another side of the rotor 340. The first bearing 360a is provided inside the inner housing 260. The second bearing 360b is provided inside the bracket 380b.

The stator 280 is provided with a stator core 281 and a stator coil 300 wound on the stator core 281. The stator core 281 is provided therein with a rotor receiving hole 285 and formed by stacking in an insulating manner a plurality of electrical steel plates 283 having a plurality of slots 287 and a plurality of teeth 289 in a circumference of the rotor receiving hole 285.

A plurality of coupling protrusions 291b that protrude along a radial direction and extend in the axial direction are formed on an outer surface of the stator core 281. In some implementations, four coupling protrusions 291b are provided on the outer surface of the stator core 281.

The plurality of coupling protrusions 291b of the stator core 281 are disposed at equal intervals along a circumferential direction of the stator core 281. In this implementation, the four coupling protrusions 291b are disposed to be 90 degrees apart from one another.

The inner housing 260 is provided with a plurality of slits 261b in which the plurality of coupling protrusions 291b is accommodated, respectively. In some implementations, the plurality of slits 261b of the inner housing 260 is four in number The plurality of slits 261b of the inner housing 260 axially extend from an outlet end (e.g., right end in FIG. 19) of the inner housing 260.

Meanwhile, as illustrated in FIG. 20, the bracket 380b is provided with a bearing accommodation portion 381 in which the bearing 360 (e.g., the second bearing 360b) is accommodated, and a plurality of bridges 3902 that axially extend from the bearing accommodation portion 381.

The plurality of bridges 3902 of the bracket 380b of this implementation are four in number. In this implementation, the plurality of legs 255b and the plurality of bridges 3902 may be configured to have a relatively small cross section compared to those of the previous implementations for achieving the same coupling force.

Each of the plurality of bridges 3902 includes a radial section 3902a that radially protrudes from the bearing accommodation portion 381 and an axial section 3902b that is bent from the radial section 3902a and extends in the axial direction.

Inner surfaces of the plurality of bridges 3902 may each have a radius of curvature corresponding to a radius of curvature of an outer diameter of the stator core 281, for example. The inner surfaces of the plurality of bridges 3902 may have, for example, arcuate cross sections, respectively.

Outer surfaces of the plurality of bridges 3902 may each have a radius of curvature corresponding to a radius of curvature of an outer diameter of the outer housing 251, for example. The outer surfaces of the plurality of bridges 3902 may have, for example, arcuate cross sections, respectively.

Each of the plurality of bridges 3902 is provided with a protruding end 395 having a cross section that gradually decreases along a protruding direction thereof, for example.

Each of the protruding ends 395 of the plurality of bridges 3902 has, for example, an arcuate cross section with its center protruding along the axial direction. Accordingly, flow resistance of air moved by the impeller 210 may be reduced.

Stator contact portions 397 in contact with the outer surface of the stator core 281 are formed on the inner surfaces (e.g., inner surfaces of the protruding ends 395) of the plurality of bridges 3902, respectively.

Each of the stator contact portions 397 of the plurality of bridges 3902 is in surface contact with the outer surface of the stator 280 (e.g., the stator core 281). Each of the stator contact portions 397 of the plurality of bridges 3902 is provided with a coupling protrusion accommodating portion 399 in which the coupling protrusion 291b of the stator 280 is accommodated. Accordingly, a circumferential clearance between the stator 280 and the bracket 380b may be reduced. This may allow the stator 280 and the bracket 380b to be securely coupled to each other.

The stator contact portions 397 of the plurality of bridges 3902 are respectively formed by cutting the inner surfaces of the plurality of bridges 3902 along a thickness direction (radial direction) by a predetermined width (thickness). In addition or alternatively, the stator contact portions 397 of the plurality of bridges 3902 are formed by cutting the inner surfaces of the plurality of bridges 3902 along the axial direction by a predetermined length (width).

Accordingly, each of the plurality of bridges 3902 is provided with an end contact portion 402 in contact with an end surface of the stator 280 (e.g., the stator core 281). As a result, an axial clearance between the stator 280 and the bracket 380b may be reduced. This may allow a coupling force between the stator 280 and the bracket 380b to be increased.

Each of the plurality of bridges 3902 is provided on its outer surface with a leg contact portion 405 that is brought into contact with the leg 255b. The leg contact portions 405 and the plurality of legs 255b are in surface contact with each other, respectively.

The plurality of legs 255b and the plurality of bridges 3902 may be adhesively coupled to each other by an adhesive 407, respectively. Alternatively or in addition, the plurality of legs 255b and the plurality of bridges 3902 may be integrally coupled to each other by a fastening member 420, respectively.

With this configuration, when the stator 280 is inserted into the inner housing 260, the coupling protrusions 291b are accommodatingly coupled to an inside of the respective slits 261b.

The rotor 340 is accommodatingly coupled to an inside of the stator 280, and the first bearing 360a is accommodatingly coupled to an inside of the bearing accommodation portion 381 of the inner housing 260. The impeller 210 is coupled to an end of the rotating shaft 341 protruding to an inside of the outer housing 251. The second bearing 360b is accommodatingly coupled to the inside of the bearing accommodation portion 381 of the bracket 380b. The coupling protrusions 291b are accommodatingly coupled to an inside of the respective coupling protrusion accommodating portions 399 of the plurality of bridges 3902 of the bracket 380b.

Here, the plurality of legs 255b and the plurality of bridges 3902 of the bracket 380b may be adhesively coupled to each other by the adhesive 407, or integrally coupled to each other by the fastening member 420.

In the foregoing, exemplary implementations of the present disclosure have been shown and described. However, the present disclosure may be embodied in various forms without departing from the spirit or essential characteristics thereof, and accordingly, it is intended that the implementations described above not be limited by the detailed description provided herein. Moreover, any other implementation that is not specifically disclosed in the foregoing detailed description should be broadly construed within the scope of the technical spirit, as defined in the accompanying claims. Furthermore, all modifications and variations included within the technical scope of the claims and their equivalents should be covered by the accompanying claims.

What is claimed is:

1. A hair dryer comprising:
a hair dryer body having an air outlet port;
a handle having an air inlet port, the handle being connected to and in fluid communication with the hair dryer body; and
an electric motor assembly disposed in the handle and comprising:
an impeller;
an outer housing that receives the impeller;
an inner housing that is positioned in the outer housing and positioned concentrically with the impeller;
a stator that is positioned at least partially in the inner housing;
a rotor that is configured to rotate relative to the stator and includes a rotating shaft coupled to the impeller;
a first bearing that is disposed at a first side of the rotor and configured to support the rotating shaft;
a second bearing that is disposed at a second side of the rotor and configured to support the rotating shaft, the second side of the rotor being opposite to the first side of the rotor along an axial direction of the rotor; and
a bracket that is disposed at the second side of the rotor and that has an inner surface coupled to the stator and an outer surface coupled to the outer housing,
wherein the first bearing is positioned inside the inner housing, and the second bearing is positioned at the bracket, and
wherein the outer housing includes a support ring that protrudes from an outer surface of the outer housing and extends along a circumferential direction of the outer housing.

2. The hair dryer of claim 1, wherein the outer housing includes an outer housing body and a plurality of legs extending from the outer housing body toward the bracket.

3. The hair dryer of claim 2, wherein the bracket includes:
a bearing accommodation portion that receives the second bearing, and
a plurality of bridges that extend from the bearing accommodation portion toward the stator.

4. The hair dryer of claim 3, wherein the plurality of bridges of the bracket include leg contact portions that contact the plurality of legs of the outer housing, respectively.

5. The hair dryer of claim 3, wherein each of the plurality of bridges of the bracket includes a stator contact portion that defines a cutout and that contacts an outer surface of the stator.

6. The hair dryer of claim 5, wherein each of the plurality of bridges of the bracket includes an end contact portion that contacts an end of the stator.

7. The hair dryer of claim 3, wherein the stator comprises:
a stator core defining a rotor receiving hole; and
a stator coil wound around the stator core,
wherein the stator core includes a coupling protrusion, and wherein the inner housing defines a slit that receives the coupling protrusion.

8. The hair dryer of claim 7, wherein each of the plurality of bridges of the bracket includes a coupling protrusion accommodating portion that receives the coupling protrusion of the stator core.

9. The hair dryer of claim 7, wherein the stator further comprises an insulator inserted between the stator core and the stator coil.

10. The hair dryer of claim 9, wherein the insulator includes an end turn insulation portion that axially protrudes from an end of the stator core and extends in a circumferential direction, the end turn insulation portion being disposed between the stator coil and the plurality of bridges of the bracket.

11. The hair dryer of claim 10, wherein the electric motor assembly comprises a Printed Circuit Board (PCB) provided at a side of the bracket and electrically connected to the stator coil.

12. The hair dryer of claim 11, wherein the PCB has a plurality of connection pins protruding toward the insulator and electrically connected to the stator coil, and
wherein the insulator includes a plurality of connection pin coupling portions to which the plurality of connection pins of the PCB are coupled.

13. The hair dryer of claim 3, wherein each of the plurality of bridges includes:
a radial section that radially protrudes from the bearing accommodation portion, and
an axial section that is connected to the radial section and extends from the radial section in the axial direction.

14. The hair dryer of claim 13, wherein each of the plurality of bridges defines a cavity.

15. The hair dryer of claim 3, wherein each of the plurality of bridges includes a protruding end having a cross section that gradually decreases along the axial direction.

16. The hair dryer of claim 2, wherein each of the plurality of legs of the outer housing has a width that gradually decreases along a longitudinal direction of each of the plurality of legs.

17. The hair dryer of claim 1, wherein the electric motor assembly comprises a plurality of vanes positioned between the inner housing and the outer housing, each of the plurality of vanes having a first side connected to the inner housing and a second side connected to the outer housing, and
wherein each of the plurality of vanes has a first end and a second end opposite to the first end along the axial direction, the first end being positioned farther from the impeller along the axial direction than the second end is, the first end being located ahead of the second end with respect to a rotation direction of the impeller.

18. The hair dryer of claim 1, wherein the rotor includes a permanent magnet coupled to the rotating shaft and configured to rotate with the rotating shaft.

19. An electric motor assembly comprising:
an impeller;
an outer housing that receives the impeller;
an inner housing that is positioned in the outer housing and positioned concentrically with the impeller;
a stator that is positioned at least partially in the inner housing;
a rotor that is configured to rotate relative to the stator and includes a rotating shaft coupled to the impeller;
a first bearing that is disposed at a first side of the rotor and supports the rotating shaft;
a second bearing that is disposed at a second side of the rotor and supports the rotating shaft, the second side of the rotor being opposite to the first side of the rotor along an axial direction of the rotor; and
a bracket that is disposed at the second side of the rotor and that has an inner surface coupled to the stator and an outer surface coupled to the outer housing,
wherein the first bearing is positioned inside the inner housing, and the second bearing is positioned at the bracket,
wherein the outer housing includes a support ring that protrudes from an outer surface of the outer housing and extends along a circumferential direction of the outer housing.

* * * * *